United States Patent
Beshai

(10) Patent No.: US 7,209,454 B2
(45) Date of Patent: Apr. 24, 2007

(54) SELF-CONFIGURING DISTRIBUTED SWITCH

(75) Inventor: Maged E. Beshai, Stittsville (CA)

(73) Assignee: Nortel Networks Limited (CA)

( * ) Notice: Subject to any disclaimer, the term of this patent is extended or adjusted under 35 U.S.C. 154(b) by 749 days.

(21) Appl. No.: 10/409,197

(22) Filed: Apr. 9, 2003

(65) Prior Publication Data

US 2003/0174697 A1    Sep. 18, 2003

Related U.S. Application Data

(62) Division of application No. 09/286,431, filed on Apr. 6, 1999, now Pat. No. 6,570,872.

(51) Int. Cl.
*H04L 12/50* (2006.01)
*H04J 14/02* (2006.01)

(52) U.S. Cl. ............ 370/254; 370/369; 370/374; 398/7; 398/48; 398/68; 398/75

(58) Field of Classification Search ........... 370/254, 370/369, 374; 398/7, 48, 68, 75
See application file for complete search history.

(56) References Cited

U.S. PATENT DOCUMENTS

| | | | | |
|---|---|---|---|---|
| 4,845,703 A | * | 7/1989 | Suzuki ................... | 398/48 |
| 5,040,169 A | * | 8/1991 | Guerin et al. ............ | 398/48 |
| 5,457,556 A | * | 10/1995 | Shiragaki ................. | 398/50 |
| 5,475,679 A | | 12/1995 | Munter ..................... | 370/58.2 |
| 5,557,610 A | | 9/1996 | Calamvokis et al. ...... | 370/60.1 |
| 5,627,925 A | * | 5/1997 | Alferness et al. .......... | 385/17 |
| 5,745,612 A | * | 4/1998 | Wang et al. .............. | 385/24 |
| 5,754,320 A | | 5/1998 | Watanabe ................. | 359/117 |

(Continued)

FOREIGN PATENT DOCUMENTS

| | | |
|---|---|---|
| EP | 0 722 233 | 7/1996 |
| EP | 0 941 011 | 8/1999 |
| EP | 0 980 168 | 3/2000 |
| WO | WO 98/25436 | 6/1998 |

OTHER PUBLICATIONS

Willner, A. E.: "Towards Uniform Channel Performance in Dynamic WDM Systems and Networks" OFC/IOOC '99 Optical Fiber Communication Conference/International Conference On Integrated Optics And Optical Fiber Communication. San Diego, CA, Feb. 21-26, 1999, Optical Fiber Communication Conference/International Conference On Integrated OP, Feb. 21, 1999, pp. THO5-1-THO5-3, XP000967036, ISBN: 0-7803-5430-3.
Jajszczyk, A. et al.: "Tree-Type Photonic Switching Networks" IEEE Network, IEEE Inc. New York, US, vol. 9, No. 1, 1995, pp. 10-16, XP000486554, ISSN: 0890-8044.

(Continued)

*Primary Examiner*—Alpus H. Hsu
(74) *Attorney, Agent, or Firm*—McGuinness & Manaras LLP

(57) ABSTRACT

An optical channel switch comprising independent optical space switches interconnects electronic data-switch modules to form a high-capacity wide-coverage network. The optical channel switch connects incoming wavelength-division-multiplexed (WDM) links each originating from a data-switch module to outgoing WDM links each terminating in a data-switch module. The optical space switches are of equal dimension, each having the same number of dual ports (input-output ports). The channels of incoming WDM links are assigned to the input ports of the space switches and the output ports of the space switches are assigned to channels of the outgoing WDM links in a manner which permits a switched path from any data-switch module to any other data-switch module even when the number of data-switch modules substantially exceeds the number of dual ports per space switch. A method of reconfiguring the channel switch in response to varying traffic demand is also disclosed.

14 Claims, 20 Drawing Sheets

U.S. PATENT DOCUMENTS

| | | | |
|---|---|---|---|
| 6,185,203 B1 | 2/2001 | Berman | 370/351 |
| 6,271,949 B1 * | 8/2001 | Suemura et al. | 398/9 |
| 6,339,488 B1 * | 1/2002 | Beshai et al. | 398/59 |
| 6,434,612 B1 | 2/2002 | Hughes et al. | 709/223 |
| 6,535,313 B1 * | 3/2003 | Fatehi et al. | 398/101 |
| 6,542,268 B1 * | 4/2003 | Rotolo et al. | 398/68 |
| 6,741,811 B2 * | 5/2004 | Nishi et al. | 398/50 |

OTHER PUBLICATIONS

Mehdi, Vaez M. et al.: "Strictly and Wide-Sense Nonblocking Photonic Switching Systems Under Crosstalk Constraint" INFOCOM '98. Seventeenth Annual Joint Conference Of The IEEE Computer And Communications Societies. Proceedings. IEEE San Francisco, CA, USA Mar. 29-Apr. 2, 1998, Nw York, NY, USA, IEEE, US, Mar. 29, 1998, pp. 118-125, XP010270306, ISBN: 0-7803-4383-2.

* cited by examiner

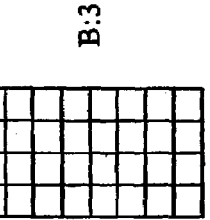
$n = 4$
$G = 4$
$W = 8$
$N = G \times n$
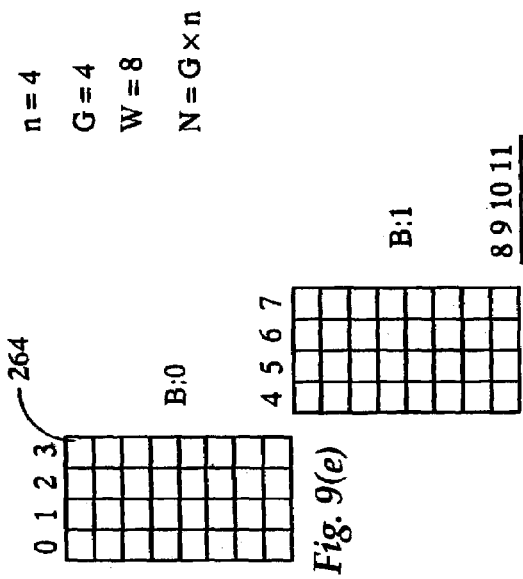
*Fig. 9(e)* *Fig. 9(f)* *Fig. 9(g)* *Fig. 9(h)*
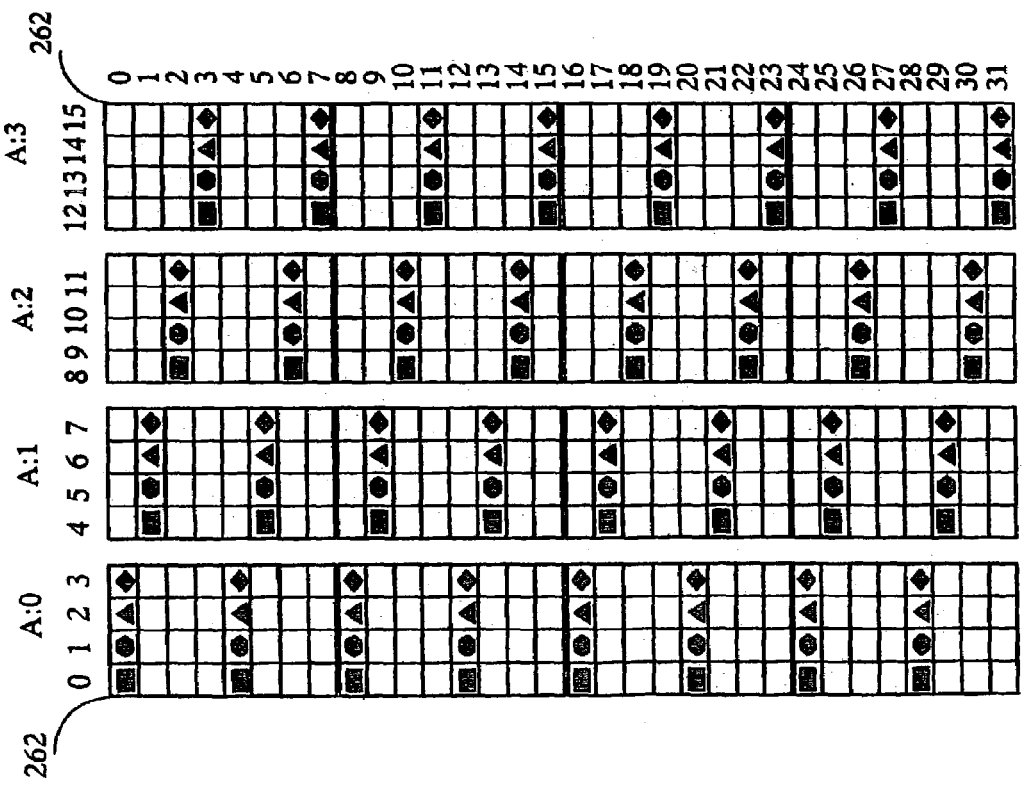
*Fig. 9(a)* *Fig. 9(b)* *Fig. 9(c)* *Fig. 9(d)*

Space switch reconfiguration

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Inlet | | | | | | | | | | | | | | | | |
| outlet | 5 | 8 | 6 | 0 | 13 | 1 | 12 | 9 | 3 | 15 | 11 | 14 | 10 | 7 | 2 | 4 |

*Fig. 12a*

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Inlet | | | | | | | | | | | | | | | | |
| outlet | 5 | 11 | 6 | 0 | 13 | 1 | 2 | 9 | 3 | 15 | 12 | 14 | 10 | 7 | 8 | 4 |

At source

To Input 1:  11 | 8

To Input 6:  12 | 11

To Input 10:    2 | 12

To Input 14:   8 | 2

Guard time

*Fig. 12d*

At space switch

Input 1:  11 | 8
Input 6:   2 | 12
Input 10: 12 | 11
Input 14:  8 | 2

$y + \bar{y} = D$ $y + \bar{y} = D$

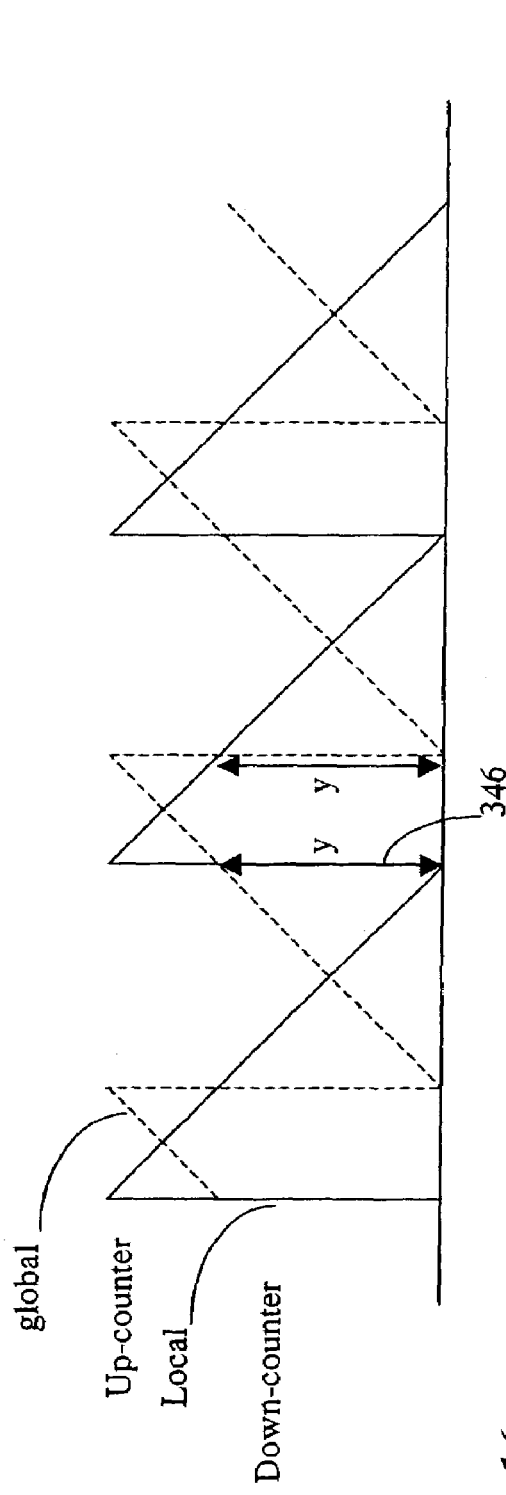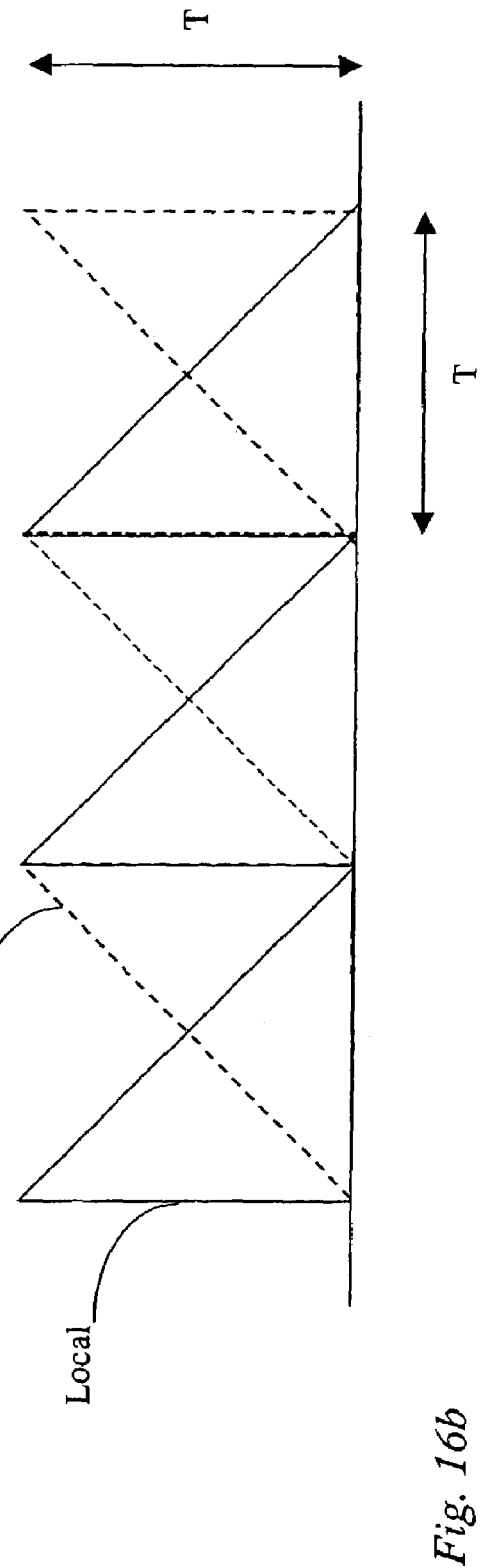
Fig. 16a
Fig. 16b

SELF-CONFIGURING DISTRIBUTED SWITCH

CROSS-REFERENCE TO RELATED APPLICATION

This application is a division of U.S. patent application Ser. No. 09/286,431, filed Apr. 6, 1999, now U.S. Pat. No. 6,570,872.

STATEMENT REGARDING FEDERALLY SPONSORED RESEARCH OR DEVELOPMENT

This work was supported by the United States Government under Technology Investment Agreement TIA F30602-98-2-0194.

TECHNICAL FIELD

This invention relates generally to high-capacity data switches. In particular, it relates to a self-configuring distributed switch with a channel-switched core which automatically adapts to varying data traffic loads in a switched data network, and has a very high switching capacity.

BACKGROUND OF THE INVENTION

The volume of data now exchanged through telecommunications networks requires data networks having a high data transfer capacity. Such networks must also serve large geographical areas. Network scalability to achieve a very high-capacity and wide-area coverage may be realized by increasing the number of nodes in a network and/or increasing the transfer capacity per node. For a given link capacity, e.g., 10 Gb/s, increasing the capacity per node necessitates increasing the number of links per node. In a balanced network, the mean number of hops per node pair is inversely proportional to the number of links per node. Decreasing the mean number of hops per node pair dramatically reduces network-control complexity, facilitates the routing function, and enables the realization of network-wide quality of service (QOS) objectives.

In order to decrease the number of hops per node pair in a network, very high-capacity switches are required. Consequently, methods are required for constructing very high-capacity switches. It is also desirable that such switches be distributed to permit switch access modules to be located in proximity of data traffic sources.

Advances in optical switching technology have greatly facilitated the construction of high-capacity switches using optical space switches in the switch core. The principal problem encountered in constructing high-capacity switches, however, is the complexity of coordinating the transfer of data between ingress and egress, while permitting the creation of new paths between the ingress and the egress. Consequently, there exists a need for a method of increasing data transfer capacity while simplifying data transfer control in a high-speed data switch.

The design of data switching systems has been extensively reported in the literature. Several design alternatives have been described. Switches of moderate capacity are preferably based on a common-buffer design. For higher capacity switches, the buffer-space-buffer switch and the linked-buffers switch have gained widespread acceptance. A switch based on an optical space-switched core is described in U.S. Pat. No. 5,475,679 which issued on Dec. 12, 1995 to Munter. An optical-core switching system is described in U.S. Pat. No. 5,575,320 which issued May 19, 1998 to Watanabe et al.

A buffer-space-buffer switch, also called a space-core switch, typically consists of a memoryless fabric connecting a number of ingress modules to a number of egress modules. The ingress and egress modules are usually physically paired, and an ingress/egress module pair often shares a common payload memory. An ingress/egress module pair that shares a common payload memory is hereafter referred to as an edge module. The passive memoryless fabric is preferably adapted to permit reconfiguration of the inlet-outlet paths within a predefined transient time. The memoryless core is completely unaware of the content of data streams that it switches. The core reconfiguration is effected by either a centralized or a distributed controller in response to spatial and temporal fluctuations in the traffic loads at the ingress modules.

The linked-buffers architecture includes module sets of electronic ingress modules, middle modules, and egress modules, and has been described extensively in the prior art. Each module is adapted to store data packets and forward the packets toward their respective destinations. The module-sets are connected in parallel using internal links of fixed capacity.

The control function for the linked-buffers switch is much simpler than the control function for the space-core switch. The capacity of the linked-buffers switch is limited by the capacity of each module-set, the number of internal links emanating from each ingress module, and the number of internal links terminating to each egress module. With a given module-set capacity, the capacity of a linked-buffers switch can be increased virtually indefinitely by increasing the number of internal links, which permits the number of module-sets in the switch to be accordingly increased. However, with a fixed module capacity, when the number of internal links is increased, the capacity of each internal link must be correspondingly reduced. Reducing the capacity of an internal link is not desirable because it limits the capacity that can be allocated to a given connection or a stream of connections. A switch with a space switch core does not suffer from this limitation.

The linked-buffers switch can be modified in a known way by replacing a module-set with a single module having a higher capacity than that of any of the modules in the module set. As described above, a module set includes an ingress module, a middle module, and an egress module. The modified configuration enables both direct and tandem connections between ingress and egress and is hereafter referred to as a mesh switch. The mesh switch enables direct switching from ingress to egress as well as tandem switching.

A disadvantage of the switching architectures described above is their limited scalability.

Prior art switches may be classified as channel switches that switch channels without examining the content of any channel, and content-aware data switches. A switched channel network has a coarse granularity. In switched data networks inter-nodal links have fixed capacities. Consequently, fluctuations in traffic loads can require excessive tandem switching loads that can reduce the throughput and affect network performance.

There therefore exists a need for a self-configuring data switch that can adapt to fluctuations in data traffic loads.

OBJECTS OF THE INVENTION

It is therefore an object of the invention to provide a very high-capacity switch with a channel-switching core.

It is another object of the invention to provide an architecture for an expandable channel-switching core.

It is yet another object of the invention to provide a self-configuring switch that adjusts its internal module-pair capacity in response to fluctuations in data traffic volumes.

It is a further object of the invention to provide a data switch that implements both direct channel paths and tandem channel paths.

It is yet a further object of the invention to provide a data switch in which channel switching and connection routing are fully coordinated.

It is a further object of the invention to provide a method and an apparatus for time coordination of connection routing and path reconfiguration.

It is a further object of the invention to provide a method of interleaving time-critical data and delay-tolerant data on a shared transmission medium.

It is a further object of the invention to provide a method of assigning inter-module paths so as to maximize the use of direct ingress/egress data transfer.

SUMMARY OF THE INVENTION

The invention provides a self-configuring data switch comprising a number of electronic switch modules interconnected by a single-stage channel switch. The single-stage channel switch comprises a number P of parallel space switches each having n input ports and n output ports. Each of the electronic modules is preferably capable of switching variable-size packets and is connected to the set of P parallel space switches by W channels, $W \leq P$. A channel may be associated with a single wavelength in one of M multiple wavelength fiber links, where W/M is a positive integer. The maximum number of modules is the integer part of n×P/W. The capacity of each module may vary from a few gigabits per second (Gb/s) to a few terabits per second (Tb/s). The module capacity is shared between the core access links and the outer access links which are connected to data traffic sources and data traffic sinks, or other data switches.

The channel switch core permits any two modules to be connected by an integer number of channels. A channel has a predefined capacity, typically several Gb/s. In order to enable the switching of traffic streams at arbitrary transfer rates, the inter-module connection pattern is changed in response to fluctuations in data traffic load. However, it may not be possible to adaptively modify the paths between modules to accommodate all data traffic variations, and it may be uneconomical to establish under-utilized paths for node-pairs of low traffic. To overcome this difficulty, a portion of the data traffic flowing between a source module and a sink module may be switched through one or more intermediate modules. Thus, in effect, the switch functions as a hybrid of a channel switch and a linked-buffers data switch, benefiting from the elastic path capacity of the channel switch and the ease of control of the linked-buffers data switch.

Changes to the channel switch connectivity are preferably computed by a global controller which determines changes in the input-output configurations of some space switches. The reconfiguration may be implemented in each of the P space switches. To realize a smooth reconfiguration, it is preferable that the connectivity changes be implemented in one space switch at a time. The central controller ensures that one-to-one mapping, or one-to-many mapping, of the channels is preserved in order to avoid collision. A collision results from many-to-one mapping.

The switching modules need not be collocated with each other or with the space switch core. Consequently, the respective lengths of the links between the switching modules and the switch core may vary significantly. Hence, a timing mechanism is needed to coordinate the reconfiguration of the inter-module paths to ensure that data is not lost during reconfiguration. The timing mechanism is distributed. One of the modules is collocated with the channel switch core and hosts a global controller. The other switch modules may be located any desired distance from the channel switch core. Each of the modules operates a local cyclical time counter of a predetermined period. Each time the local counter turns zero, the module sends a timing packet to the global controller. On receipt of a timing packet, the global controller time-stamps the packet and places it in a transmit queue from which it is transferred back to its respective module. On receipt of the returned stamped timing packet, a module extracts the time-stamp information and uses it to adjust its time counter at an appropriate time. This coordinates the local time counter with the global time counter to enable switch reconfigurations with a minimal guard time. The guard time is also needed to compensate for transient periods in the channel switch during reconfiguration.

BRIEF DESCRIPTION OF THE DRAWINGS

Further features and advantages of the present invention will become apparent from the following detailed description, taken in combination with the appended drawings, in which:

FIG. 3c is a schematic diagram of a partially-connected space switch which is a mirror-image of the switch of FIG. 3a;

FIG. 5b shows the connectivity of a partially-connected core with reference to one of the space switches, the core connectivity being a mirror-image of the connectivity related to FIG. 5a;

FIG. 7 shows the connection of a module hosting a global controller to the partially connected switch core shown in FIG. 3a;

FIG. 9 illustrates a data structure used for connection routing in a switch with a partially-connected core;

FIGS. 12a–d illustrate the process of switch core reconfiguration;

FIG. 16a illustrates misalignment of a global timing counter and a timing counter associated with a module where the former is an up-counter and the latter is a down counter;

FIG. 16b illustrates the alignment of a global timing counter and a timing counter associated with a module, the former being an up counter and the latter being a down counter.

DETAILED DESCRIPTION OF THE PREFERRED EMBODIMENT

Figure 1A:
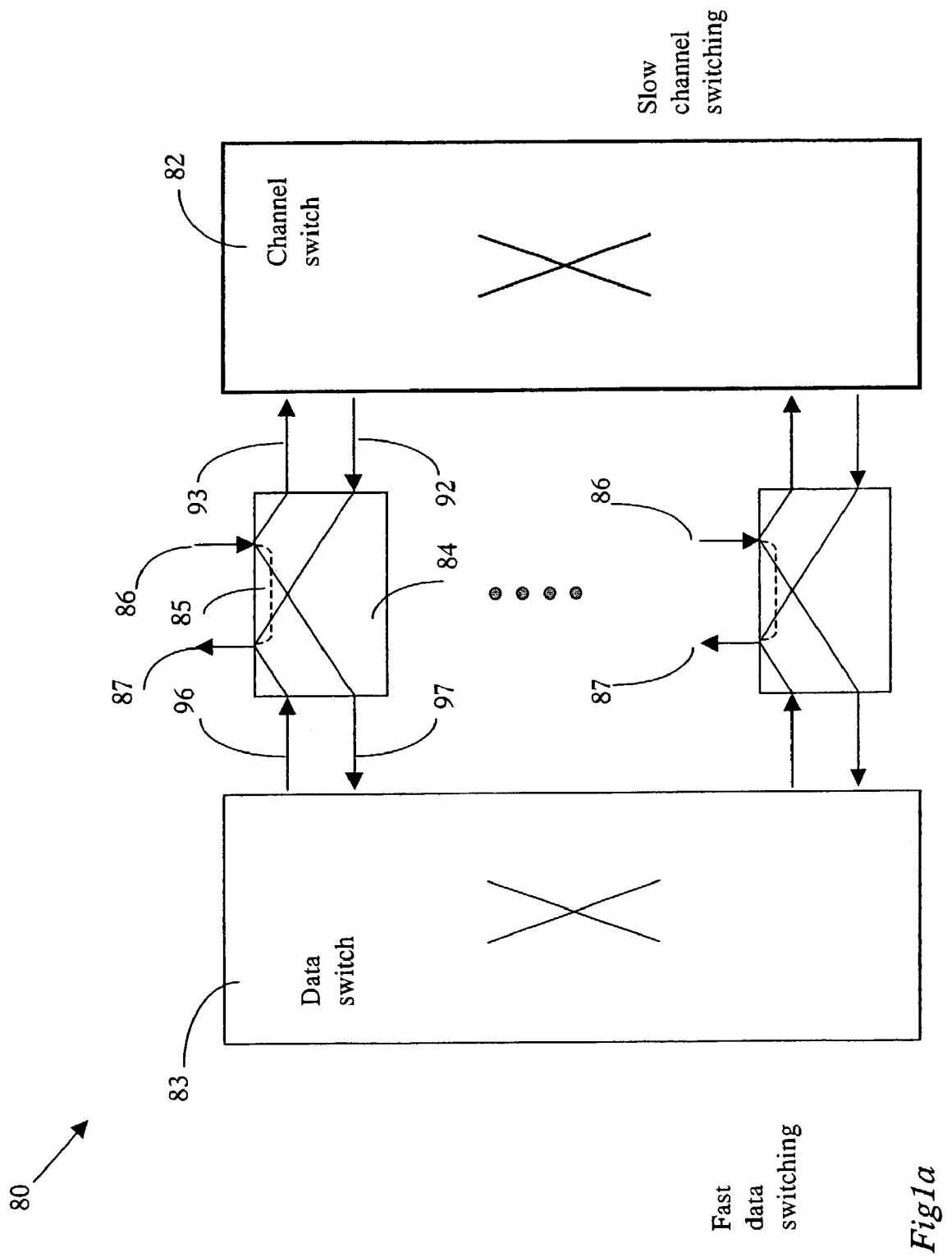
FIG. 1a is a schematic diagram of a hybrid switch comprising a channel switch and a data switch interconnecting a bank of electronic modules.

Definitions
(1) Source module and sink module: With respect to a given connection between a traffic source and a traffic sink, a source module is the module supporting the traffic source and a sink module is the module supporting the traffic sink.
(2) Link: A physical transmission medium between a signal transmitter and a receiver; for example, an optical fiber.
(3) Channel: A designated allotment of the capacity of a link between a signal transmitter and a receiver; for example, a wavelength in a wavelength division multiplexed (WDM) optical fiber.
(4) Path: Two or more concatenated channels form a path.
(5) Connection: A reserved portion of a path.
(6) Connection routing: The process of selecting a path between a source module and a sink module.
(7) Channel assignment: The process of selecting the channels to form a path.
(8) Multiplex: A number of channels multiplexed in at least one transmission medium.
(9) Incoming multiplex: A multiplex arriving at a switching device.
(10) Outgoing multiplex: A multiplex emanating from a switching device.
(11) Reconfiguration guard time: A time interval during which no data is transmitted over a connection in order to account for transient periods during a reconfiguration of connections.
(12) Ingress port: Port of a switching module receiving data from subtending data traffic sources.
(13) Egress port: Port of a switching module transmitting data to subordinate data traffic sinks.
(14) Core-input channel: A channel from a switching module to a switch core.
(15) Core-output channel: A channel from switch core to a switching module.
(16) Module-pair capacity: In a directly interconnected module pair, the lesser of a sending capacity of a first module and a receiving capacity of a second module in the pair.
(17) Fully-connected module-pair: A directly connected module pair which is connected by a set of paths having a combined capacity equal to the module-pair capacity. The paths may be shared by other module pairs.
(18) Partially-connected module-pair: A directly connected module pair connected by a set of paths having a combined capacity which is less than the module-pair capacity.
(19) Fully-connected switch: A switch in which all module pairs are fully connected. In a fully-connected switch, the paths connecting any given module pair may be congested under certain traffic conditions.
(20) Partially-connected switch: A switch in which some module pairs are partially-connected pairs.
(21) Normalized traffic unit: A dimensionless traffic unit defined as the data rate divided by a channel capacity. The data rate and the channel capacity are normally expressed in bits per second.
(22) Clock period: A time interval between successive clock pulses.
(23) Time-counter period: A period D of a digital counter used to indicate time. The period D is less than or equal to $2^C$, C being a word length of the counter.
(24) Data switch: A data switch receives data from a number of incoming channels, identifies predefined data units, and directs the data units to respective outgoing channels. Data switches include telephony switches, frame-relay switches, ATM switches, and IP routers. In a network based on data switches, the inter-switch channel allocation is fixed.
(25) Channel switch: A memoryless switch that connects any of a number of incoming channels to any of an equal number of outgoing channels without examining the data content of any channel. The interconnection may be effected by a bank of space switches, and the interconnection pattern may be modified. However, an interval between successive interconnection reconfigurations is preferably much longer than a mean transfer time of a data unit. For example, in a data packet switch, the mean packet transfer time may be of the order of 100 nsec while the mean channel switching period would be of the order of a few milliseconds. In a network based on channel switches, the inter-module channel allocations are time-variant. End-to-end paths whose capacities match the respective end-to-end data traffic are formed by rearranging the connectivity of the channels.
(26) Data traffic routing: Data traffic routing is the process of directing an identifiable data unit or a stream of such units to a path selected from a set of two or more paths. The path is predefined and may comprise a number of concatenated channels, each channel having a defined point of origin and a defined destination.

(27) Module-state matrix: A 2×N matrix, where N is the number of modules. Entry (0, j), $0 \leq j < N$, stores the combined available vacancy on all channels from a module j to the channel-switching core and entry (1, j), $0 \leq j < N$, stores the combined available vacancy on all channels from the channel-switching core to the module j.

(28) Channel-vacancy matrices: A matrix having a number of columns equal to the number of incoming multiplexes and a number of rows equal to the number of space switches. Each entry in the matrix is initialized by a number representative of the capacity of a channel and dynamically stores a respective available capacity.

(29) Vacancy matching process: A first channel vacancy matrix and a second channel-vacancy matrix are compared to determine the lesser of two corresponding entries. The first matrix stores the available capacity in each channel from an incoming multiplex to channel switch core. The second matrix stores the available capacity in each channel from the channel switch core to an outgoing multiplex. Comparing two columns of the first and second matrices determines the available capacity between respective incoming and outgoing multiplexes.

The present invention provides a hybrid switch that combines the benefits of a channel switch with the benefits of a data switch. In a self-configuring switch in accordance with the invention, the control system enables the creation of inter-module paths, and controls the routing of connections to existing or new paths. The path configuration is changed slowly, in milliseconds for example, thus providing the switch control system sufficient time to compute required core path reconfigurations.

FIG. 1a is a schematic diagram of a hybrid switch in accordance with the invention which includes N electronic modules 84, a channel switch 82 and a dedicated data switch 83 which switches only tandem connections. Each module 84 receives data traffic from subtending traffic sources through incoming feeder links 86 and delivers data traffic destined to subordinate sinks through outgoing feeder links 87. Local subtending data traffic is switched directly to subordinate sinks through each module 84 as indicated by the dashed line 85. Each module 84 receives W incoming channels 92 from the channel switch 82, and sends W channels 93 to the channel switch 82. Each module 84 also receives B channels 96 from the data switch 83 and sends B channels 97 to the data switch 83.

Figure 1B:
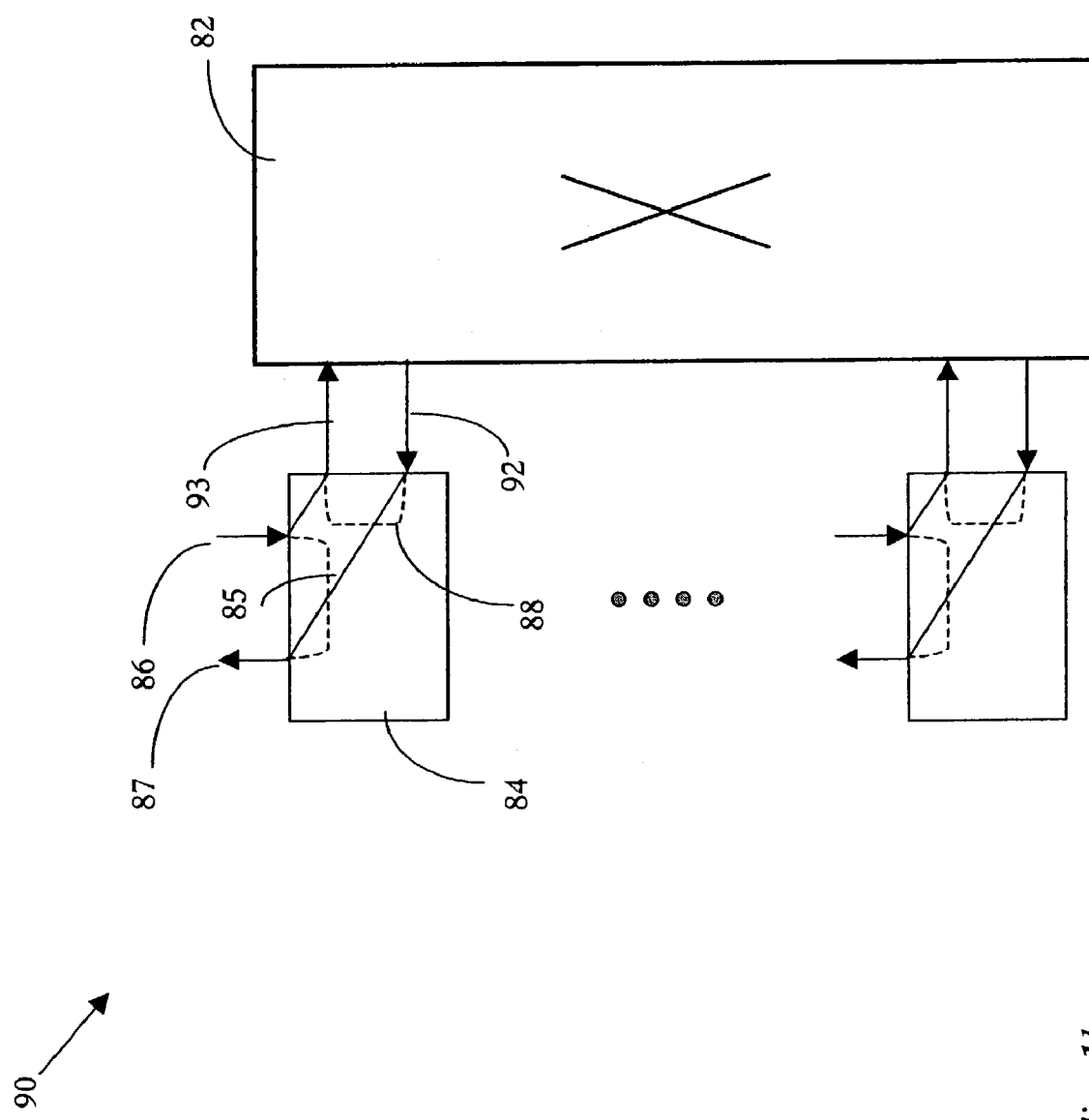
FIG. 1b is a schematic diagram of a hybrid switch functionally equivalent to the hybrid switch of FIG. 1a with the edge modules performing the data-switching function.

FIG. 1b is a schematic diagram of a hybrid switch similar to that shown in FIG. 1a, except that the data switch 83 is eliminated and tandem data switching is performed at the edge modules as indicated by the dashed line 88 of FIG. 1b. The configuration of FIG. 1b enables higher efficiency than that of FIG. 1a due to the sharing of channels 92 and 93 by direct traffic and tandem switched traffic.

High-Capacity Core

The capacity of a switch based on a space switch core augmented by tandem switching can be expanded to a high capacity because the space switch connectivity requires reconfiguration less frequently, if complemented by tandem switching. The capacity of the space switch itself is, however, a limiting factor. Further capacity growth can be realized using a parallel arrangement of space switches. Using optical space switches, and with wavelength-division multiplexing, the parallel space switches may operate at different wavelengths in a manner well known in the art.

Figure 2:
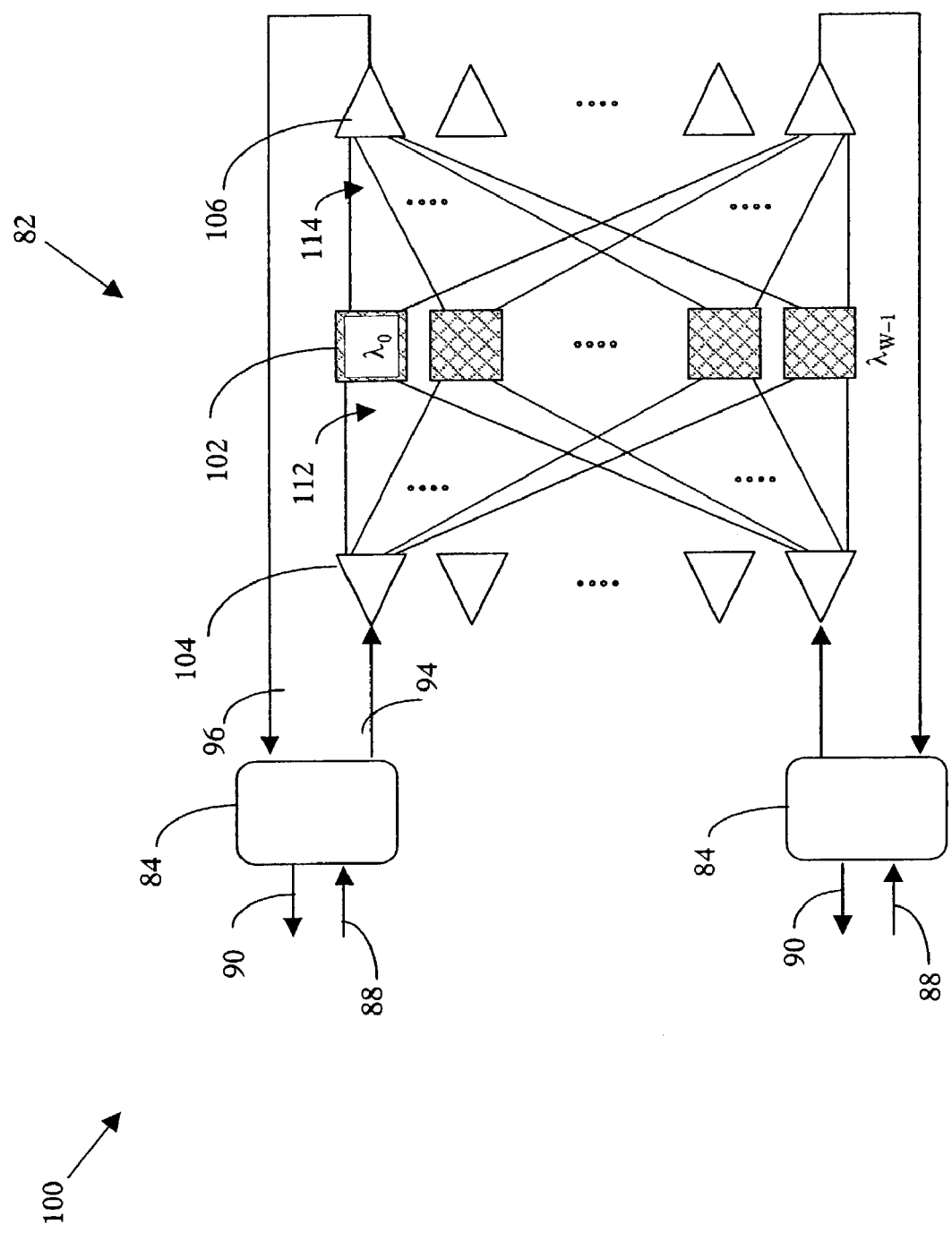
FIG. 2 is a schematic diagram of a switch having a bank of edge modules interconnected by a fully-connected core comprising a bank of space switches.

FIG. 2 is a schematic diagram of a wavelength-multiplexed switch 100 in accordance with the invention having a known configuration of a wavelength-multiplexed space switch core 82. The space switch core 82 includes a bank of W identical (n×n) space switches 102, each space switch 102 having n inputs and n outputs, n>1, each input being a channel of a predefined wavelength. All inputs to a given space switch 102 are of the same wavelength. Demultiplexer 104 separates the multiplexed channels in incoming multiplex 94 into individual channels 112, which are routed to different space switches 102 according to their respective wavelengths. The switched channels at the output of each space switch 102 are connected to multiplexers 106 and the multiplexed switched channels are grouped in at least one outgoing multiplex 96 and returned to the ingress/egress modules 84. The input-output connection pattern for each space switch 102 is determined by a global controller that is described below in more detail.

The capacity of the switch 100 is limited by the capacity of each of the space switches 102 and the number of channels in each incoming multiplex 94. The number of core-output channels grouped in at least one outgoing multiplex 96 is preferably equal to the number of core-input channels grouped in at least one incoming multiplex 94.

Figure 3A:
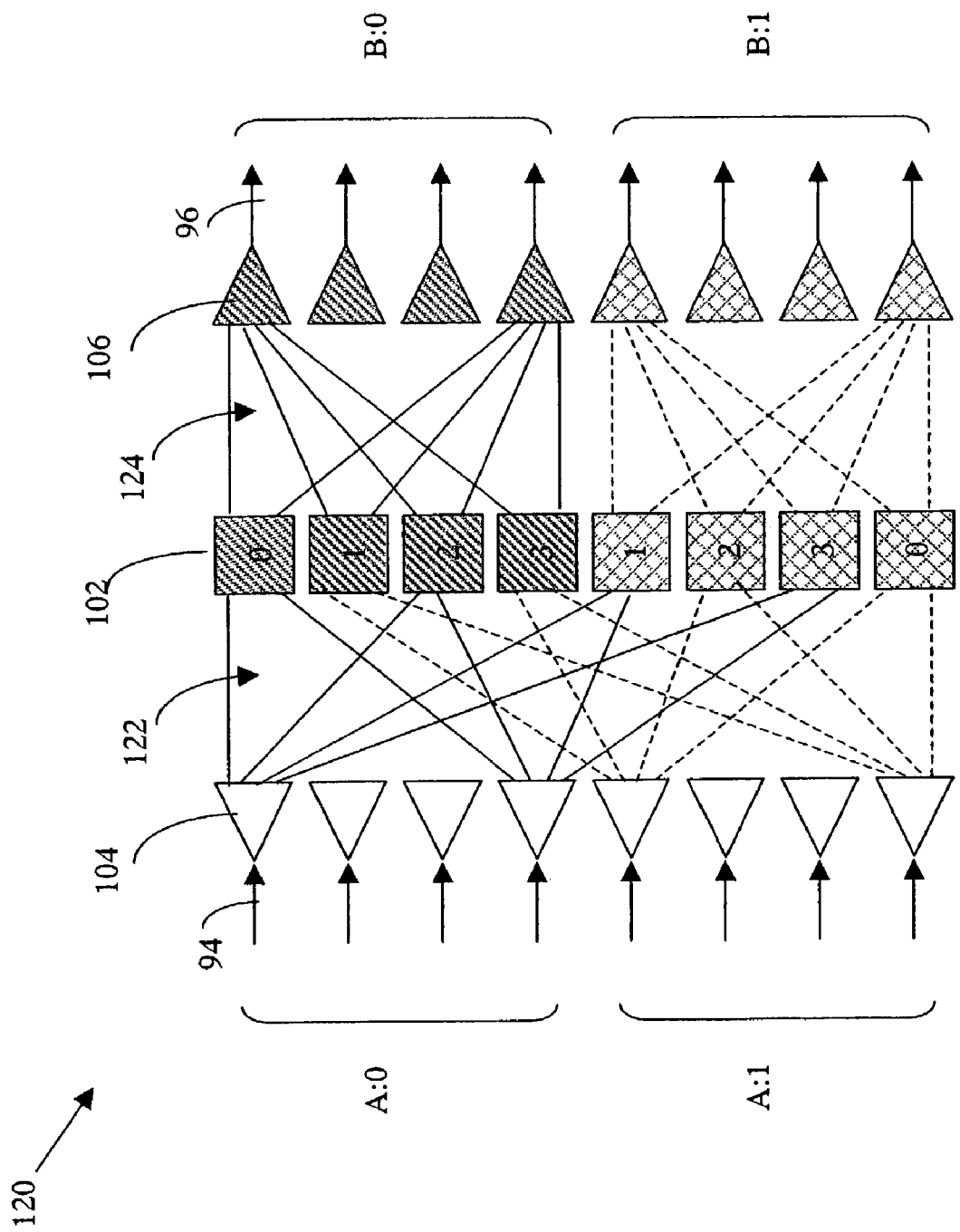
FIG. 3a is a schematic diagram of a partially-connected space switch core having double the capacity of a corresponding switch with a fully-connected core shown in FIG. 2.

FIG. 3a shows an example of a wavelength multiplexed space switch core 120 with a number of space switches 102 larger than the number of channels in an incoming multiplex 94. In this example, each incoming multiplex comprises four channels and the demultiplexed channels are routed to four inner links 122. Sets of four inner links 124 are wavelength multiplexed onto outgoing multiplexes 96. The incoming multiplexes are divided into two groups labelled "A:0" and "A:1". The outgoing multiplexes are divided into two groups labelled "B:0" and "B:1". The channels of an incoming multiplex are divided as shown so that some channels are routed to outgoing multiplex "B:0" and the remaining channels are routed to outgoing multiplex "B:1". With equal group sizes, and with even division of the internal channels 122, the maximum number of channels that an incoming multiplex can switch to a given outgoing multiplex equals the number of channels of the incoming multiplex divided by the number of groups of outgoing multiplexes. The numerals shown in space switches 102 represent the respective wavelengths they switch. The pattern of wavelengths switched by the lower group of the space switches 102 is a shifted pattern of the wavelengths switched by the space switches 102 in the upper group.

If the channels of an incoming multiplex are wavelength multiplexed, each space switch 102 is associated with a wavelength and the space switches are arranged according to their designated wavelength in such a way as to avoid the duplication of any wavelength in any outgoing multiplex.

Figure 3B:
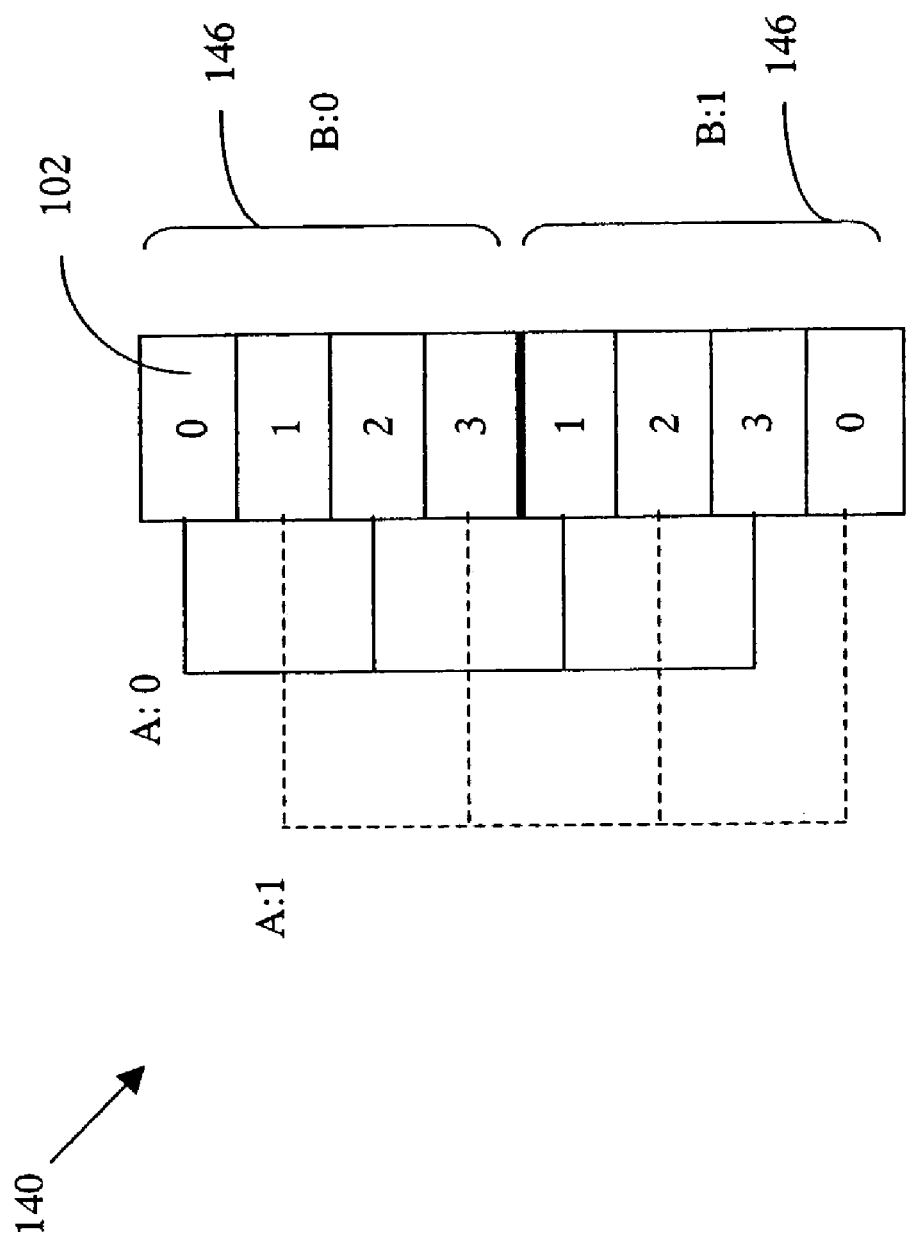
FIG. 3b is a simplified representation of the partially-connected core of FIG. 3a, showing the wavelength assignment in a wavelength division multiplexed (WDM) core.

FIG. 3b is a simplified representation of the configuration shown in FIG. 3a.

Figure 3C:
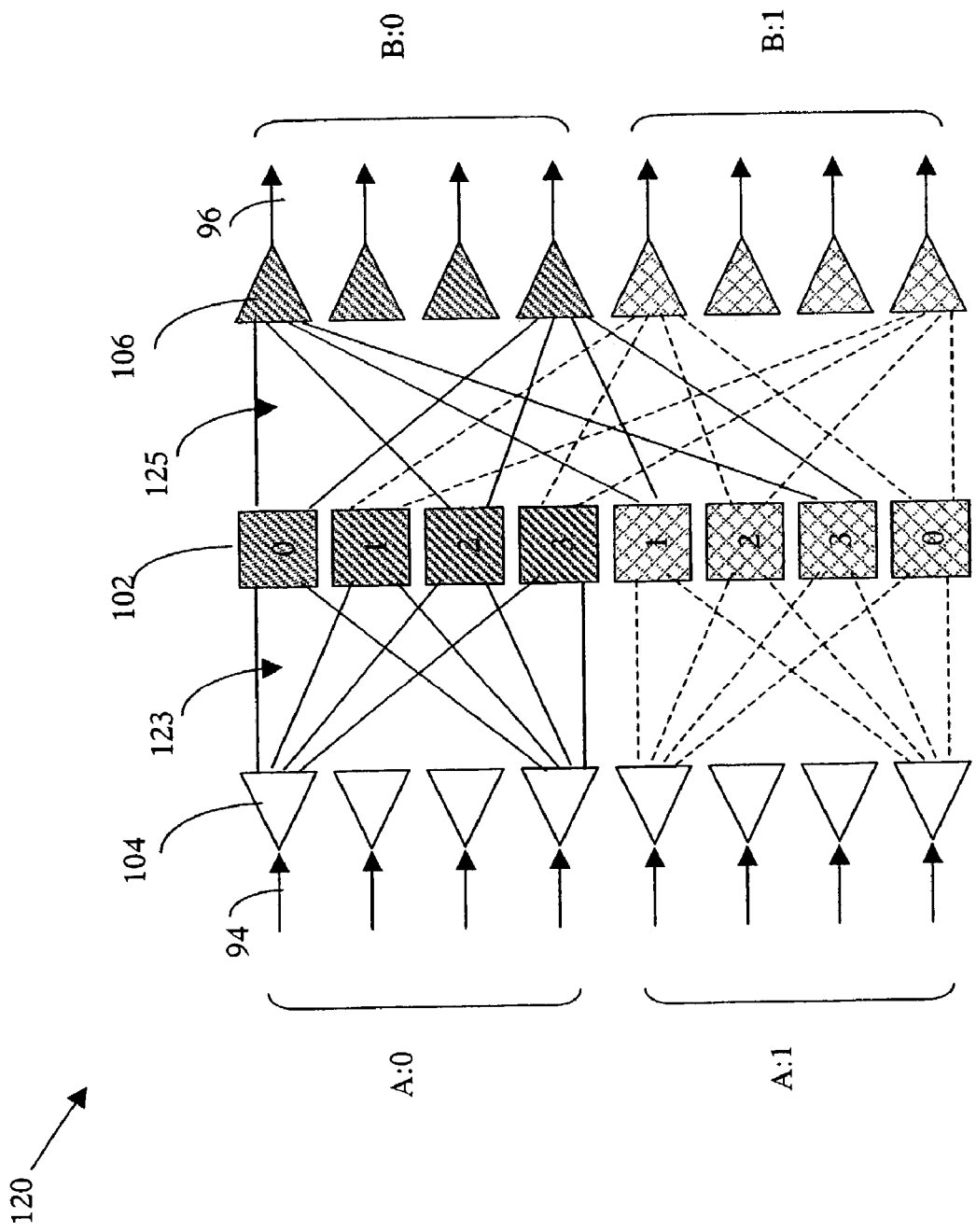

FIG. 3c shows the same example described with reference to FIG. 3a, except that the connection pattern between the input demultiplexers and the space switches and the connection pattern between the space switches and the output multiplexers are reversed. The space switch cores shown in FIGS. 3a and 3c are functionally equivalent.

Figure 4:
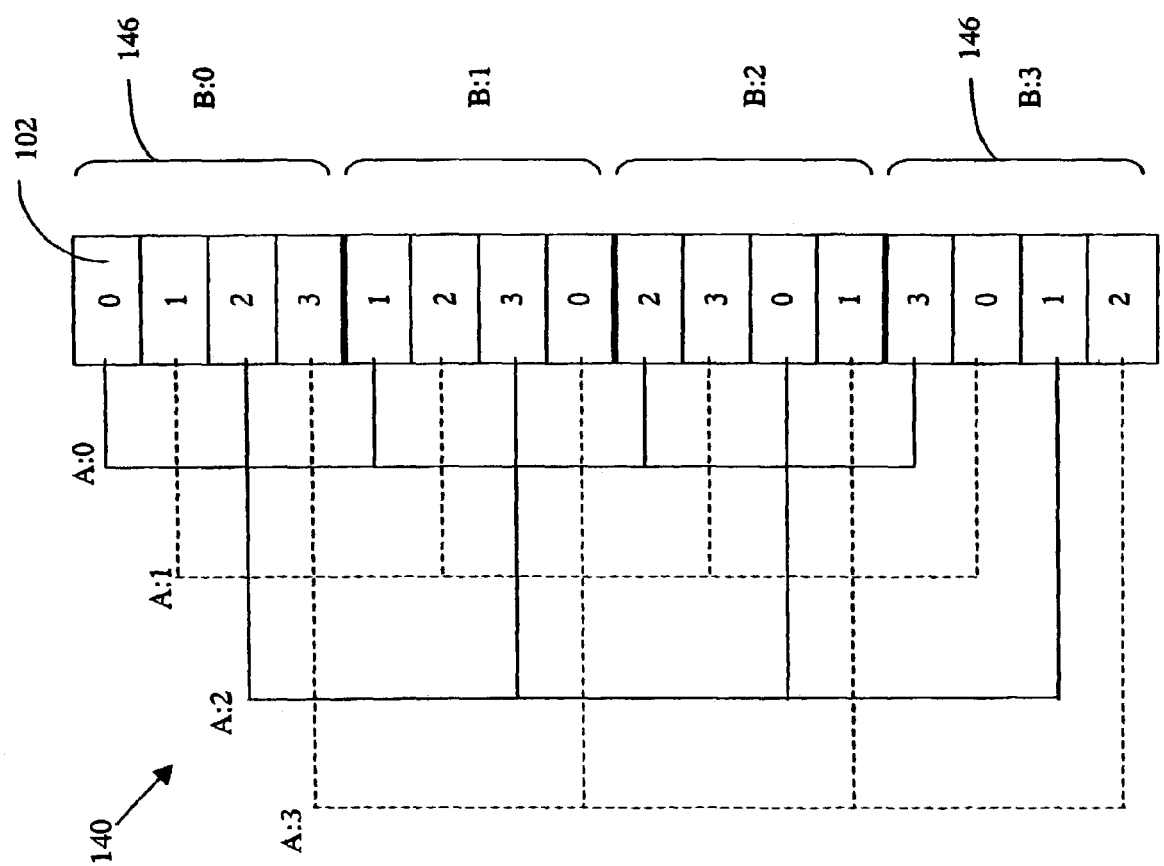
FIG. 4 is a simplified representation of a partially-connected core of four times the capacity of a corresponding fully-connected core constructed with the same space switches, the wavelength assignment in a WDM implementation being indicated.

FIG. 4 illustrates a configuration in which the number of edge modules is four times the number of input ports for each space switch 102. In this configuration, the edge modules are logically divided into four groups. The space switches 102 are also logically divided into four groups, as are the outgoing multiplexes. Each edge module routes only a quarter of its channels through the space switch core to any group. Likewise, each module can route at most one quarter of its channels through the core to any other edge module. Greater inter-module connectivity is realized through tandem switching. The space switches in each group are arranged in a shifted pattern in accordance with the wavelengths they switch. The channels of each incoming multiplex are distributed equally among the four groups of space switches. FIG. 4 shows 16 space switches 102 divided into four groups. The respective groups switch wavelengths {0, 1, 2, 3}, {1, 2, 3, 0}, {2, 3, 0, 1}, and {3, 0, 1, 2}. The incoming multiplexes are divided into four groups labelled A:0 through A:3, and each group includes four incoming multiplexes. The outgoing multiplexes are divided into four groups labelled B:0 through B:3, and each group includes four outgoing multiplexes. Each group of space switches is directly associated with a group of outgoing multiplexes. Each incoming multiplex has four channels. The channels of each incoming multiplex in group A:0 are assigned to corresponding space switches 102 in the four groups of space switches. For example, the four channels of an incoming multiplex belonging to group A:0 are assigned to the first space switch in each of the space switch groups B:0 through B:3. As is apparent, this arrangement of the core ensures that there is no duplication of a wavelength in any outgoing multiplex.

Figure 5A:
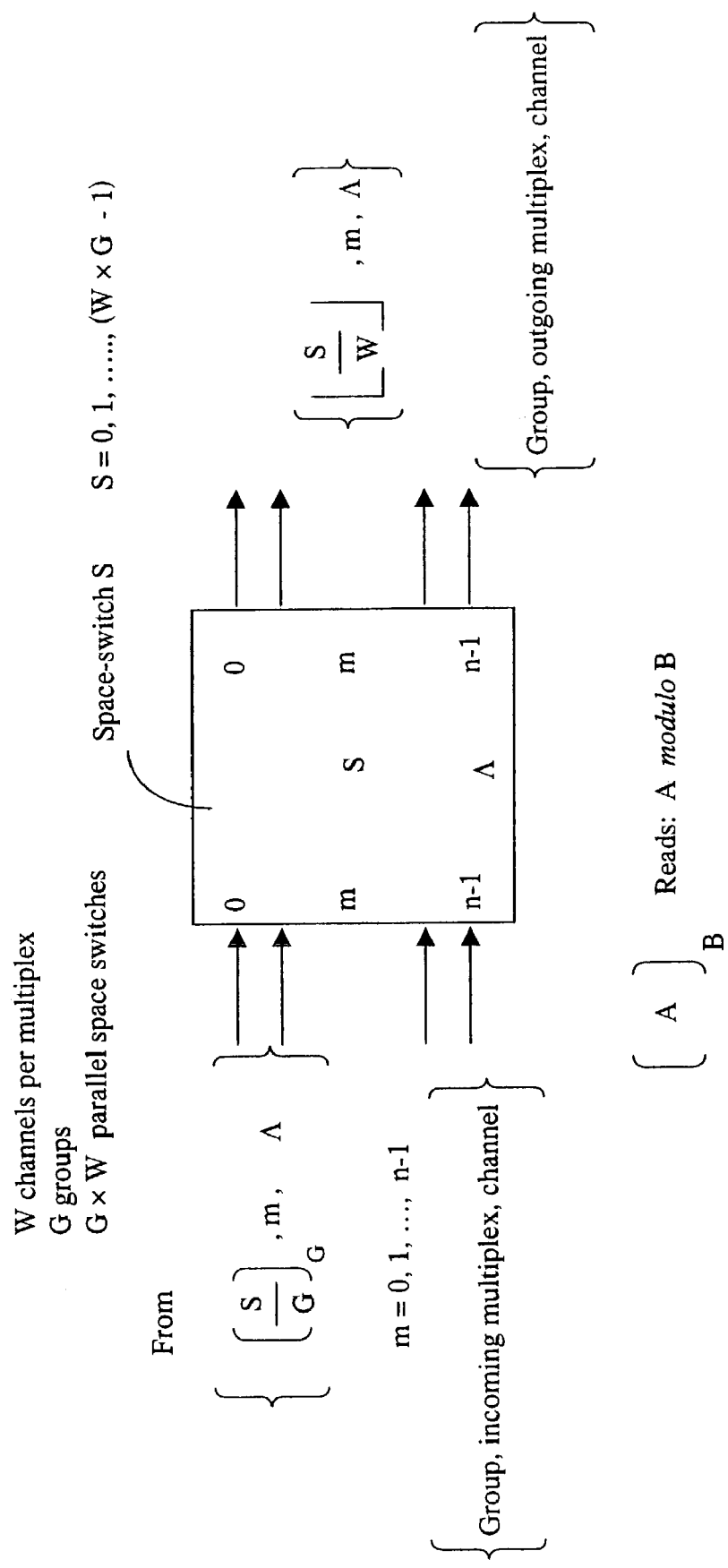
FIG. 5a shows the connectivity of a partially-connected core with reference to one of the space switches.

FIG. 5a depicts the connection pattern for any channel switch assembled with G groups, G>0, numbered 0 to G-1. Each incoming and outgoing channel is identified by a group number, a relative multiplex number within the group, and a channel number. There are G×W space switches, numbered sequentially from 0 to G×W−1. FIG. 5a relates to space switch number S which is associated with wavelength Λ. A link 122 from group number $[S/G]_G$ (the ratio S/G modulo G), multiplex number m, and a channel corresponding to wavelength Λ connects to input port m of space switch S, $0 \leq m < n$, $0 \leq S < G \times W$. An output port m of switch S is connected by link 114 to channel corresponding to wavelength Λ, in multiplex m, in group $\lfloor S/W \rfloor$, where $\lfloor u \rfloor$ denotes the integer part of a real number u. For example, in FIG. 3a, wavelength number 3 in multiplex 3 in group 0 is connected to input port number 3 in space switch number 6, while output port number 3 in space switch number 6 is connected by a link 124 to wavelength number 3 in outgoing multiplex number 3 in group 1.

Figure 5B:
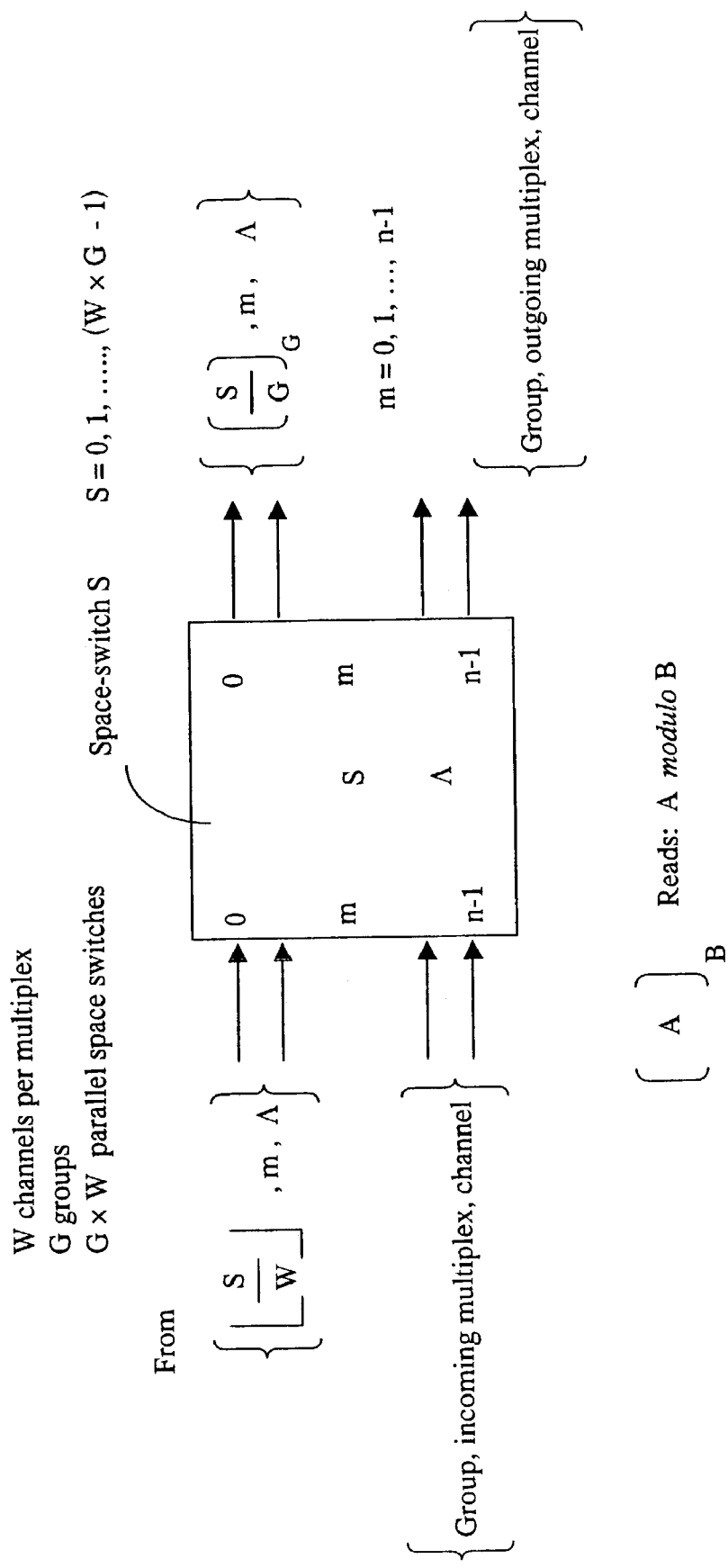

FIG. 5b shows the connection pattern for a channel switch core with a connectivity that is a mirror image of the connectivity of the channel switch core represented in FIG. 5a.

Control Mechanism

Figure 6:
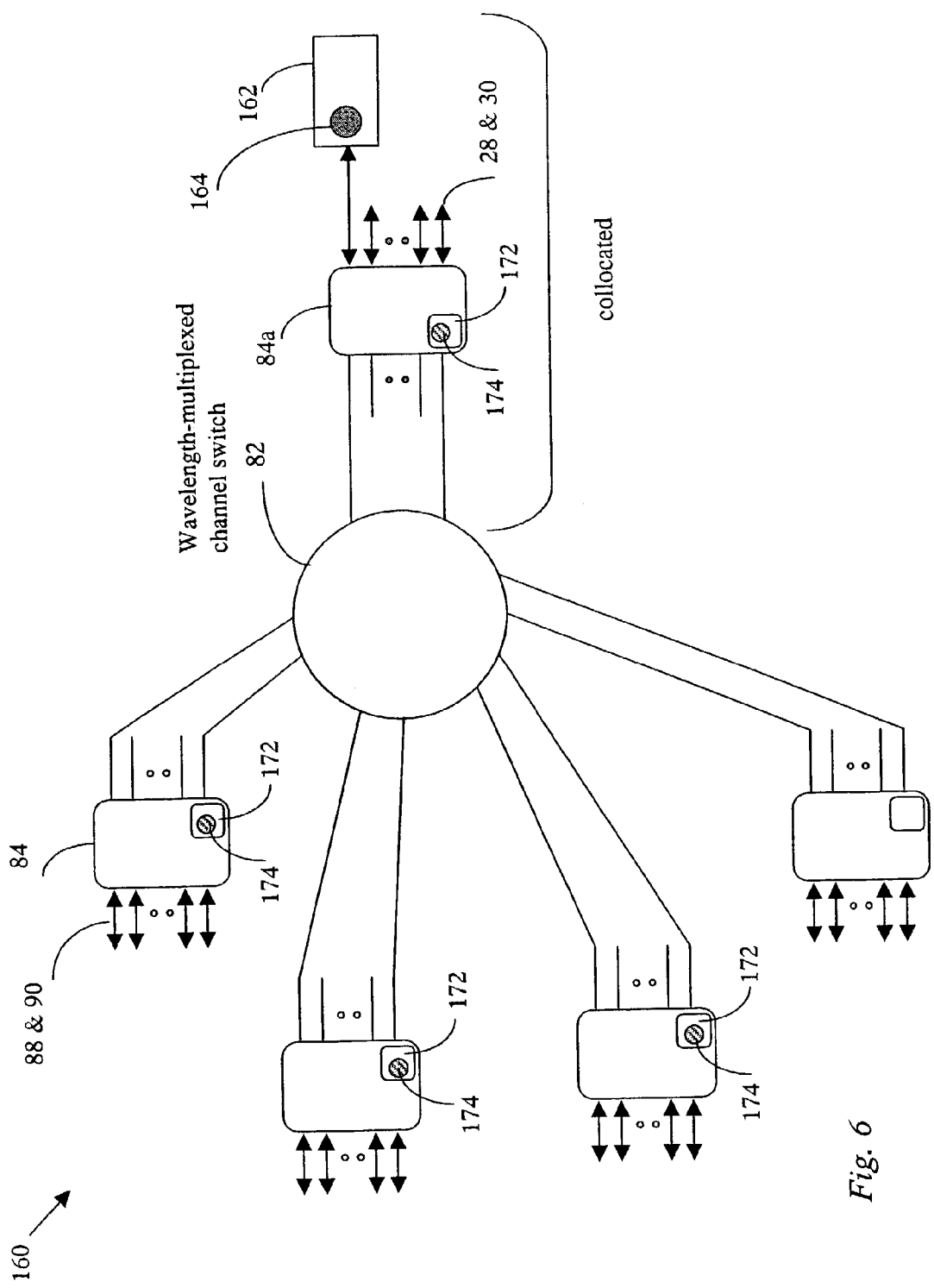
FIG. 6 is a schematic diagram of a hybrid distributed switch showing the control elements.

As described above, in a hybrid switch in accordance with the invention, the channel switch core must be controlled to reconfigure in response to changes in traffic loads. FIG. 6 illustrates a mechanism for channel assignment and switching-time coordination in a hybrid switch schematically shown in FIGS. 1a and 1b. Several electronic data switch modules 84 are interconnected through a wavelength-multiplexed channel switch core 82. At least one of the modules 84a is collocated with the channel switch core 82 and hosts a global controller 162 which includes a time counter circuit 164. Global controller 162 receives traffic load information from each local controller 172 of modules 84, including its host module 84a, and determines desirable configuration changes for the core using an algorithm that is described below. In addition, controller 162 determines a time at which each reconfiguration of the core must occur. The global controller 162 periodically reviews the configuration of the switch to determine whether reconfiguration of the core is required. In order to provide the global controller 162 with traffic volume and timing data, each module 84 must have at least one path routed to module 84a, which hosts the global controller 162.

The configuration or reconfiguration of the connectivity of each of the space switches in the wavelength multiplexed space switch core 82 must be coordinated with corresponding switching processes in the modules 84. The time counter circuit 164 associated with the global controller 162 includes a global clock and a time counter (not shown). A time counter circuit 174 in each module controller 172 of each module 84, 84a includes a module clock and a time counter, preferably having an identical period to that of the global clock in time counter circuit 164. The global controller 162 communicates with the modules 84 to maintain a measurable difference between a value of each time counter in a circuit 174 and the time counter in circuit 164. The propagation delay between the modules and the global controller 162 must be taken into account in determining a core reconfiguration schedule. Without precise coordination between the modules 84 and the space switch core 82, some connections may be forced to an idle state for relatively long periods of time to ensure that data is not lost during a switch core reconfiguration.

The host module 84a switches payload data traffic as well as control data traffic. Global controller 162 is preferably connected to only one ingress/egress port of host module 84a. The egress port of module 84 connected to the global controller 162 is hereafter referred to as the control port of the module 84. Each channel directed to the global controller 162, carries timing data, hereafter called type-1 data, and traffic related or payload data, hereafter called type-2 data. Type-2 data is relatively delay-insensitive. The type-1 data must be transferred without delay, either according to a schedule or in response to a stimulus. At least one register stores the type-1 data and at least one buffer stores the type-2 data in each module 84. The traffic volume of the type-2 data is generally much greater than that of the type-1 data.

Figure 17:
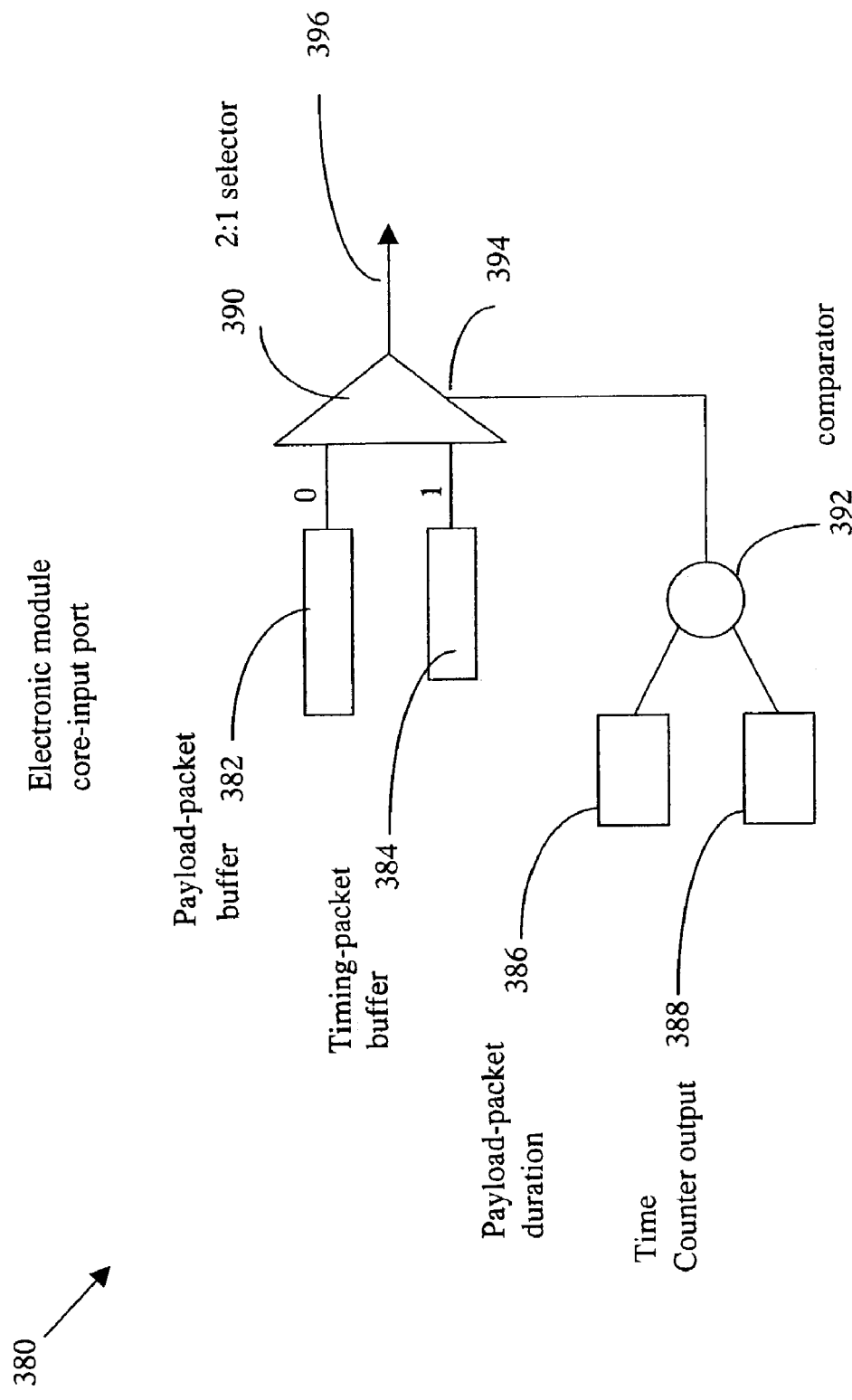
FIG. 17 is a schematic diagram of a control circuit used at an egress port for a control channel connecting each module to a module that hosts a global controller for a distributed switch. It will be noted that throughout the appended drawings, like features are identified by like reference numerals.

A selector enables data units from one of the buffers to egress at a given time. When a timing packet arrives, it must egress at a predefined time and transfer control must be exercised to ensure that the transfer of a packet from a type-2 buffer does not interfere with the transfer of the type-1 data. A transfer control circuit associated with the control port enables egress of the two traffic types while ensuring adherence to the strict time requirement of the type-1 data, as will be explained below in detail with reference to FIG. 17.

Figure 7:
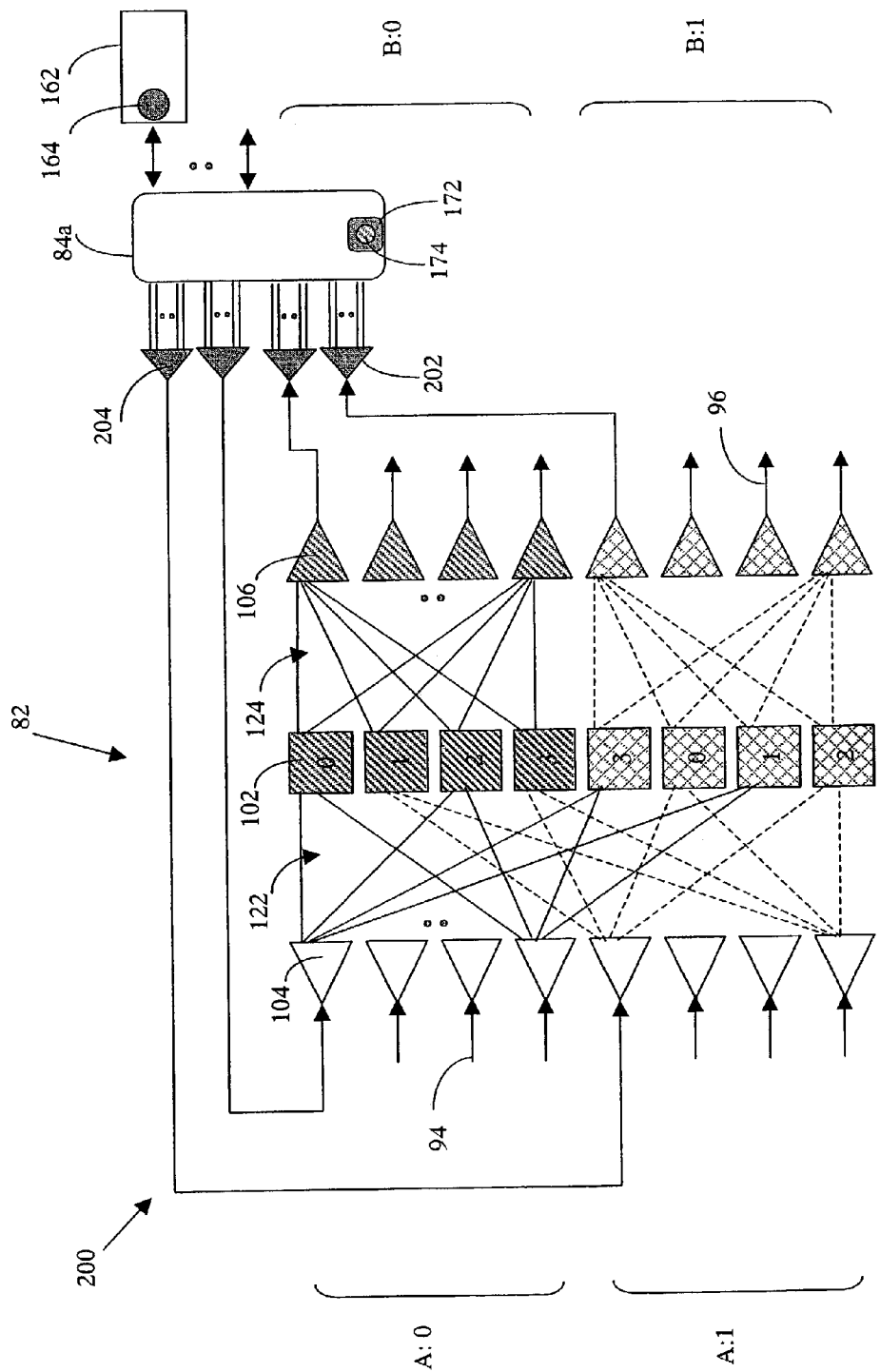

FIG. 7 illustrates the channel connectivity from each incoming multiplex 94 to module 84a which hosts the global controller 162. Each multiplex must provide at least one channel to module 84a in order to provide access to the global controller 162. The switch configuration shown in FIG. 3a is used in this example. An incoming multiplex and an outgoing multiplex connect each module to the space switch core. Each incoming multiplex 94 has one of its channels routed to one of two demultiplexers 202. A demultiplexer 202 is needed per group. The channel from an incoming multiplex 94 to a demultiplexer 202 carries control data units and payload data units. The control data units include both traffic load measurement data and timing data. Similarly, module 84a routes a channel to each outgoing multiplex 96.

Channel-Switch Reconfiguration

Each module has a fixed number W of one-way channels to the core, and it receives a fixed number, preferably equal to W, of one-way channels from the core. The former are hereafter called A-channels, and the latter are called B-channels. A path from a module X to a module Y is formed by joining an A-channel emanating from module X to a B-channel terminating on module Y. Connecting the A-channel to the B-channel takes place at a core space switch. The number of paths from any module to any other module can vary from zero to W. The process of changing the number of paths between two modules is a reconfiguration process which changes the connection-pattern of module pairs. A route from a module X to another module Y may have one path or two concatenated paths joined at a module other than modules X or Y. This is referred to as a loop path. A larger number of concatenated paths may be used to form a route. However, this leads to undesirable control complexity.

If the core is not reconfigured to follow the spatial and temporal traffic variations, a high traffic load from a module X to a module Y may have to use parallel loop-path routes. A loop-path route may not be economical since it uses more transmission facilities and an extra step of data switching at a module 84, 84a. In addition, tandem switching in the loop path adds to delay jitter.

Reconfiguration of the core is performed concurrently with a connection-routing process. Two approaches may be adopted. The first, a passive approach, joins free A-channels to free B channels without disturbing connections in progress. The second, an active approach, may rearrange some of the connections in progress in order to pack the A-channels and B-channels and hence increase the opportunity of having free A channels and B channels to create a larger number of new paths. Rearrangement of a connection to free a channel is subject to the timing coordination required in any reconfiguration. It is noted that freeing an A-channel of a path while keeping the B-channel unchanged is a preferred practice since it does not require pausing of data transfer at the source module after a new path is created.

It is emphasized that the objective of reconfiguration is to maximize the proportion of the inter-module traffic that can be routed directly without recourse to tandem switching in a loop path. However, connections from a module X to a module Y which collectively require a capacity that is much smaller than a channel capacity preferably use loop-path routes. Establishing a direct path in this case is wasteful unless the path can be quickly established and released, which may not be feasible. For example, a set of connections from a module X to a module Y collectively requiring a 100 Mb/s capacity in a switch core with a channel capacity of 10 Gb/s uses only 1% of a path capacity. If a core reconfiguration is performed every millisecond, the connection from module X to module Y would be re-established every 100 milliseconds to yield a 100 Mb/s connection. This means that some traffic units arriving at module X may have to wait for 100 milliseconds before being sent to module Y. A delay of that magnitude is unacceptable and a better solution is to use a loop path where the data traffic for the connections flows steadily through a tandem switched loop path through one of the edge modules other than modules X or Y.

Path Formation

Any of the channels belonging to an incoming multiplex has fixed connectivity with a predetermined set of space switches. Those channels may be paired with channels from the predetermined set of space switches to the outgoing multiplexes. The paired channels form inter-module paths. In a WDM core, each incoming or outgoing multiplex connects to W space switches, W being the number of wavelengths (channels) in each multiplex.

A module pair may be connected by an integer number of paths, ranging from zero to the number of channels in a multiplex. During a switch reconfiguration period, the number of paths connecting a module-pair may change, and new connections may be routed to existing or newly-created paths. It is also possible to reroute an existing connection to another path in order to free a path used by the connection and thus facilitate the formation of new paths between other module pairs.

Figure 8:
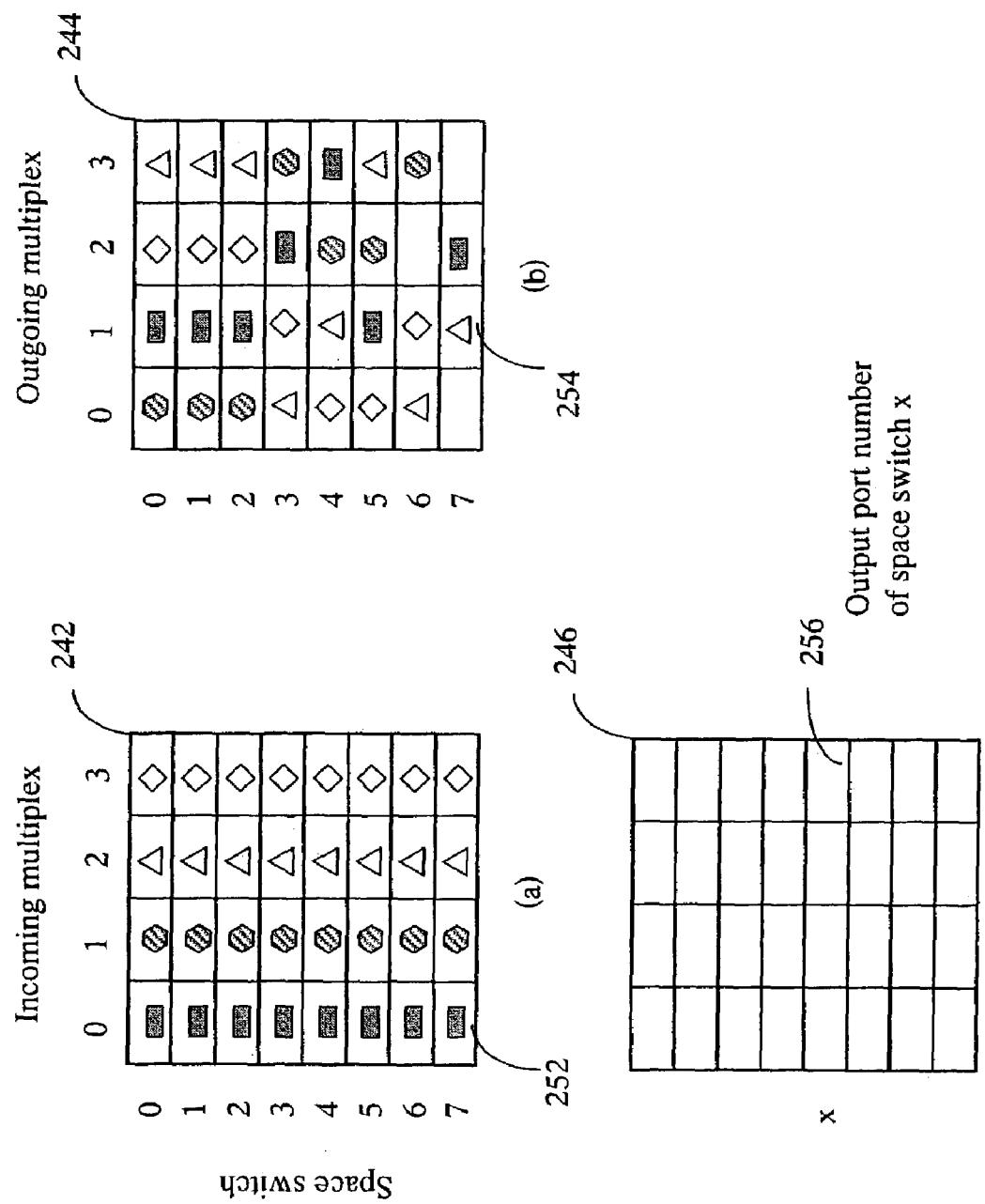
FIG. 8 illustrates a data structure used for connection routing in a switch with a fully-connected core.
Figure 10:
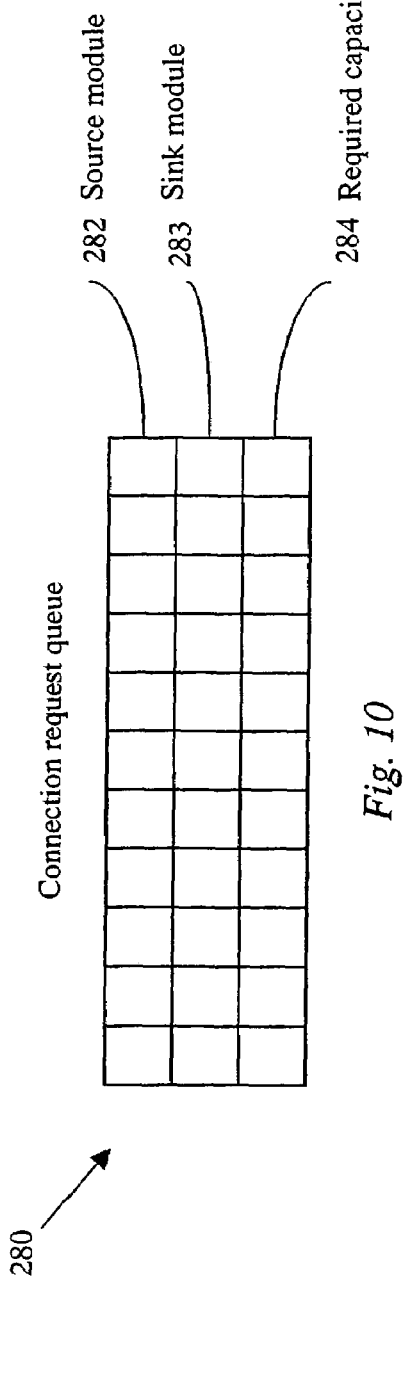
FIG. 10 is a schematic diagram of a connection request queue used in the global controller for processing connection requests from subtending data sources.
Figure 11:
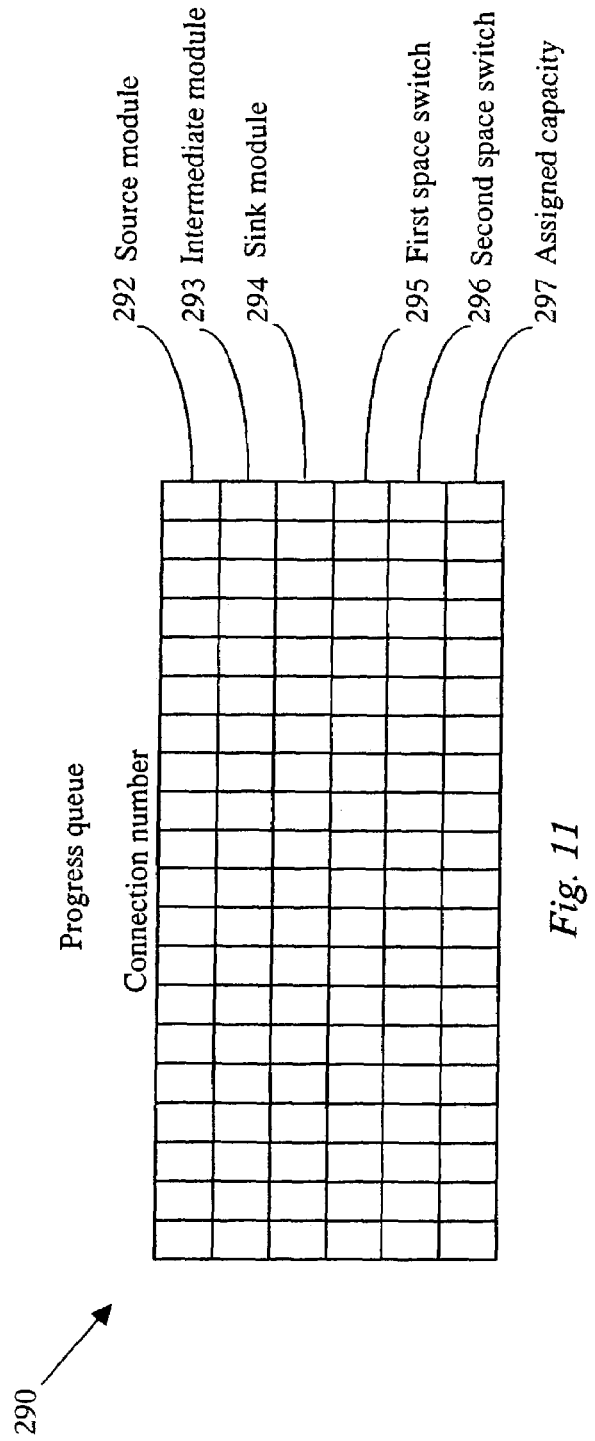
FIG. 11 is a schematic diagram of a progress queue used by the global controller to track connections in progress.

The channel assignment process will first be described for the fully-connected channel switch (G=1) shown in FIG. 2. FIG. 8 illustrates memory tables used in the channel assignment process in switch 100 shown in FIG. 2. The example shown is that for four incoming multiplexes each including eight channels: Two matrices 242, and 244, are used to facilitate the assignment process. Matrix 242 stores indicators of the vacancies in incoming multiplexes and matrix 244 stores indicators of the vacancies in outgoing multiplexes. The symbols shown in FIG. 8 identify the channels of each multiplex. This is for illustration only, numeric values representative of the respective vacancies being used in an actual implementation of the assignment procedure. As shown, the four outgoing multiplexes 0, 1, 2, and 3 receive 0, 4, 2, and 1 channels, respectively, from incoming multiplex 0. The channel assignment process will be described below in more detail with reference to FIGS. 10 and 11. The outcome of the assignment process is stored in a matrix 246, each row of which corresponds to one of the space switches. Each entry in matrix 246 has a width of $\log_2 n$ bits (rounded up to nearest integer), n being the number of input ports in a space switch 102, and storing the identity of the output port of the same space switch 102 to which an input port is connected.

FIG. 9 illustrates the channel assignment process for an extended switch 140 shown in FIG. 4. In this example, there are 16 incoming multiplexes, each including 8 channels (W=8). The incoming multiplexes are divided into equal groups (G=4) labeled A:0, A:1, A:2, and A:3. The symbols used in the figure identify channels of corresponding incoming multiplexes in the four groups. A small space switch core is used here for ease of illustration. Typically, n=16, G=4, W=128, i.e., N=G×n=64, leading to an inner capacity equal to N×W×R=8192 R. With R=10 Gb/s, this is 80 Tb/s.

A matrix 262 is used to indicate the unassigned capacity of input ports of a space-switch group to facilitate the channel assignment process. The four matrices 262 are represented separately for illustration only. The four matrices can be interleaved in a single 4×32 matrix. Each matrix 264 has 4×8 entries, each entry indicates the unassigned capacity in a respective output port of a respective space switch. The outcome of the assignment process is stored in a companion matrix 264 of 4×32 entries, each entry being $\log_2 n$ bits wide (rounded up) and storing the identity of an output port to which the respective input port is to be connected.

Referring to FIG. 8 and FIG. 9, a matching operation involves a simple comparison of two corresponding entries, one in matrix 242 (262 in FIG. 9) and the other in matrix 244 (264 in FIG. 9), followed by a subtraction if a connection is assigned. (Recall that G denotes the number of groups, n the number of inputs or outputs per space switch, and W is the number of channels per incoming or outgoing multiplex). The channel switch 82 is fully connected if G=1, and partially connected if G>1. The number of modules is N=n×G. A fully connected channel switch 82 with N modules would require W space switches of N inputs and N outputs. The use of more than one group (G>1) reduces the complexity of the space switch design and reduces the matching effort, but full connectivity is sacrificed.

A partially-connected channel switch cannot serve as a switch core unless augmented with tandem loop-path switching to handle spatial traffic variations. Full connectivity of the channel switch may be necessary during periods of severe spatial imbalance in data traffic loads. With partial connectivity, the disparity of module-pair loads can lead to a significant proportion of the traffic being forced into loop paths.

Core Reconfiguration and Channel Assignment

As explained above, a connection is routed to a path between a source and a sink. A module 84 receiving a connection request from a subordinate traffic source (not shown) is a source module, and the module 84 hosting the sink (not shown) is a sink module. A direct path between a source module 84 and a sink module 84 comprises a channel from the source module to a space switch 102 in the switch core and a channel from the space switch 102 to the sink module. A tandem loop path between a source module and a sink module comprises two direct paths, one from the source module through a space switch in the core to an intermediate module, and one from the intermediate module through a space switch in the core to the sink module. The intermediate module is any module, except the source and sink modules.

When a source module receives a connection request, it sends the request to the global controller 162 (FIG. 6). The global controller 162 routes connections to paths, and reconfigures the channel connections in the core as required to accommodate temporal and spatial fluctuations in traffic loads. Preferably, the connection routing process is performed periodically. The time between successive connection routing processes is preferably equal to a reconfiguration period. Connection requests received by each module 84, 84a from subtending traffic sources (not shown) are transferred to the global controller 162 for processing. Connection requests received by the global controller 162 from the modules during a reconfiguration period are preferably processed in a batch.

The channel assignment process includes the following steps:

(I) The global controller 162 maintains a 2×N module-state matrix (not shown) storing the free capacities of the N modules 84, 84a. One row of the matrix stores each module's available capacity on channels connecting the module to the core and the second row of the matrix stores the available capacity on channels connecting the core to each module.

(II) When a new connection request is sent from a module 84, 84a to the global controller 162, the sink module is identified. The corresponding entries in the module-state matrix are examined. If either entry is smaller than the connection capacity requested in the connection request, the connection request is placed in a standby queue (not shown). Otherwise, the connection request is entered in a connection request queue 280 shown in FIG. 10, and the entries in the 2×N module-state matrix are debited accordingly. Each entry in the connection request queue 280 includes three fields: a source module identifier 282, a sink module identifier 283, and a requested connection capacity 284. The standby queue has the same format as the connection request queue. The connection capacity requested is preferably represented as a fraction of a capacity of a channel. A 20-bit representation of the channel capacity, for example, permits an integer representation of each fraction with a relative accuracy within 1 per million. A request entered in the request queue may be accepted if an internal route can be found as described in the following steps:

(1) The request queue is sorted in a descending order according to capacity requirement before a matching process begins;

(2) An attempt is made to find a direct path from the source module to the sink module for each connection request in the request queue. This involves carrying out a matching process as described above. The matching process is implemented for each entry in the request queue starting with the highest requested connection capacity. A request for a high connection capacity has fewer matching opportunities than a request for a small connection capacity. Thus, the requests for higher connection capacities are preferably processed before the available channel capacity is assigned to requests for low capacity connections.

Each time a connection request is successfully assigned, each of the corresponding entries in the channel-vacancy matrices (242, 244) or (262, 264) is decreased by the value of the assigned capacity.

Each successful connection is deleted from the request queue, assigned an internal connection number, and entered in a progress queue. The internal connection number is selected from a pool of K recycled connection numbers in a manner well understood in the art. If all the K connection numbers are assigned, processing the request queue is stopped for the reconfiguration period in progress and resumes in subsequent reconfiguration periods. The number K is the maximum number of connections that can be supported at any given time. This value is selected to be sufficiently large to render the event of a full progress queue improbable. A full progress queue results in delaying the processing of the request queue until a subsequent reconfiguration period.

The progress queue preferably has K columns and six rows, and a column is indexed by the internal connection number. The six rows in the progress queue (FIG. 11) are used to store the source module identifier 292, intermediate module identifier 293 (if any), sink module identifier 294, space switch identifier 295 in first path, space switch identifier 296 in second path (if any), and capacity assigned 297, respectively. The intermediate module and second space switch entries are null in the case of a direct path. The progress queue is stored in a memory accessed by the global controller 162. When this step is complete, the request queue contains only the requests that could not be routed via direct paths.

(3) An attempt is made to find a loop path which requires tandem switching at an intermediate module as described above for any requests remaining in the request queue. The remaining connection requests are processed sequentially. The process includes a step of finding a matching path from the source module to an intermediate module and a matching path from the intermediate module to the sink module.

(4) Each request that can be assigned a loop path is deleted from the request queue, assigned an internal connection number as described above, and entered in the progress queue. A column corresponding to a loop path in the progress queue includes the source module identifier 292, the intermediate module identifier 293, the sink module identifier 294, the first connecting space switch identifier 295, the second connecting space switch identifier 296, and the capacity assigned 297.

(5) The remaining requests in the request queue are rejected in the current reconfiguration cycle and the respective capacities 284 indicated in the request queue are credited in the 2×N module-state matrix (not shown) as described in step(I) above.

(6) If any request is rejected in step 5, the queue of standby requests is examined to determine if any standby request can exploit the vacancy created by the rejected request. Steps 1 to 5 are repeated replacing the request queue with the standby queue. The standby queue is preferably sorted in a descending order according to the value of the requested connection capacity.

(7) When a connection is terminated, its assigned capacity is added to corresponding entries-in the channel-vacancy matrices (242, 244) or (262, 264), and the 2×N module-state matrix and the connection number is returned to the pool of recycled connection numbers. Thus, the corresponding column in the progress queue becomes available for use by a new connection. Initially the free-capacity arrays store the total internal capacity of the respective modules. The channel vacancy matrices are initialized to contain the capacity of a channel.

In order to increase the opportunity of accommodating future requests, the space switches should be scanned in a sequential order from 0 to W−1 in each matching attempt, and the intermediate modules in loop paths are attempted in a sequential order.

Centralized Switch Reconfiguration

In a centralized switch, edge modules are located in the vicinity of the space switch core and the propagation delay between each module 84 (FIG. 6) and the optical channel switch 82 may be sufficiently small to be contained within a relatively short reconfiguration guard time. The core reconfiguration process can be frequent, the constraint on the frequency being principally the speed of the global controller 162. The global controller 162 sends connection-change requests to all participating modules a given lead time prior to a reconfiguration target time T, the lead time being sufficient to permit each participating module to implement the required connection rearrangement by the target time.

Distributed Switch Reconfiguration

It is desirable that the modules 84 be located close to their traffic sources and not necessarily in the vicinity of the space switch core 82. Consequently, the propagation delay between a module 84 and the space switch core 82 may be of the order of a millisecond or so. An interval of the order of a millisecond is too long to be practically and economically contained in a guard time.

Two main requirements stem directly from the variance of the delay from the modules to the channel switch. The first is the need to align the local time counter 174 at each module 84 with the global time counter 164 at the global controller 162, which is used as a reference time. The time counter alignment must be based on the individual propagation delays from each module to the space switch core 82. The second is a restriction on connection reconfiguration to account for a propagation delay variation between the space switch core 82 and the sink module. The latter requires that a traffic connection re-routed from a loop path to either a direct route or another loop path pause for a predetermined interval of time in order to ensure that no data in transit can arrive at the destination module after the data transferred to the destination module via the new route. A transfer from a direct path to a loop path or another direct path does not result in out-of-sequence data blocks.

Selection of the Time Counter Period (1) The period D of a time counter (164, 174) must be at least equal to the sum of a largest propagation delay between any module 84 and the global controller 162 and a time allowance sufficient for any module to implement a connection reconfiguration.

Timing Control

All clocks in the time counter circuits 164 and 174 (FIG. 6) are synchronized using techniques well known in the art. As noted above, time coordination is required to harmonize the switching function in the switch core 82 and the modules 84, 84a to ensure that no data units are lost during switch core reconfiguration.

FIGS. 12a–d illustrate the time coordination performed during the reconfiguration process. In this example, each space switch in the core has 16 input ports and 16 output ports. Arrays 306 and 308 (FIG. 12a) show the input-output connectivity of a given 16-port space switch core 102 before and after reconfiguration. In this example, global controller 162 (FIG. 6) has determined that the space switch core connectivity should be reconfigured so that ingress module 1 connects to egress module 11 instead of egress module 8, ingress module 6 connects to egress module 2 instead of egress module 12, etc. The new connectivity in the switch core is shown in FIG. 12b. The required changes are shown in underline and bold type in FIGS. 12a and 12b and include inputs 1, 6, 10 and 14. The reconfiguration also requires a change in transfer buffer pointers (not shown) at the ingress modules 1, 6, 10 and 14 so that data units for the new destination are output on the respective channels after the reconfiguration shown in FIG. 12d. As shown in FIGS. 12c and 12d, packets 312 are the last packets that the affected ingress modules transmit through the core prior to reconfiguration, and packets 314 are the first packets transmitted through the core after reconfiguration. The separation between packets 312 and 314 represents a guard time to account for a reconfiguration transition delay at the space switch core 82 (FIG. 6). The packet streams from inputs 1, 6, 10 and 14 are sent at their local times T and arrive at the space switch core at global time T, as determined by collocated global time counter 164, in accordance with a transmit time coordination method in accordance with the invention.

Timing packets are exchanged between each local time counter circuit 174 and global time counter circuit 164 of the global controller 162. Each module controller 172 transmits a timing packet when its local time counter reaches zero. This may be performed each time the local time counter reaches zero, or after a predetermined number of cycles determined to be appropriate. All time counters have the same widths of C bits, 20 bits for example, with a counter period of $\delta \times 2^C$, $\delta$ being the clock period. The clock period is the same in all modules. For example, with C=20 and $\delta$=100 nsec, the counter period is about 100 msec. The timing packet is sent to the global controller 162. Upon receipt of each timing packet, controller 162 stamps the packet according to the reading of global time counter 164. The stamped packets are queued and transmitted back to their source modules. The timing counter at the source module is reset to zero when it reaches a value determined according to the time stamp in the returned timing packet.

The method of determining the resetting time is described in detail below. By doing so, a packet transmitted at local time X at any module will always arrive at the core channel switch at global time X. Thus, when the global controller 162 determines that reconfiguration of one of the space switches 162 is desirable, it computes a desirable time T for effecting the reconfiguration then it sends the value T in a reconfiguration packet to the affected modules as illustrated in FIG. 13b. The reconfiguration request packet sent to a module also contains relevant data on the new connectivity of the space switch. Preferably, the reconfiguration request packets are sent at global time "Ø" and the reconfiguration target time is specified as time T is equal to D. The module then performs the necessary internal switchover of traffic streams when its local time counter is equal to time T.

Figure 13A:
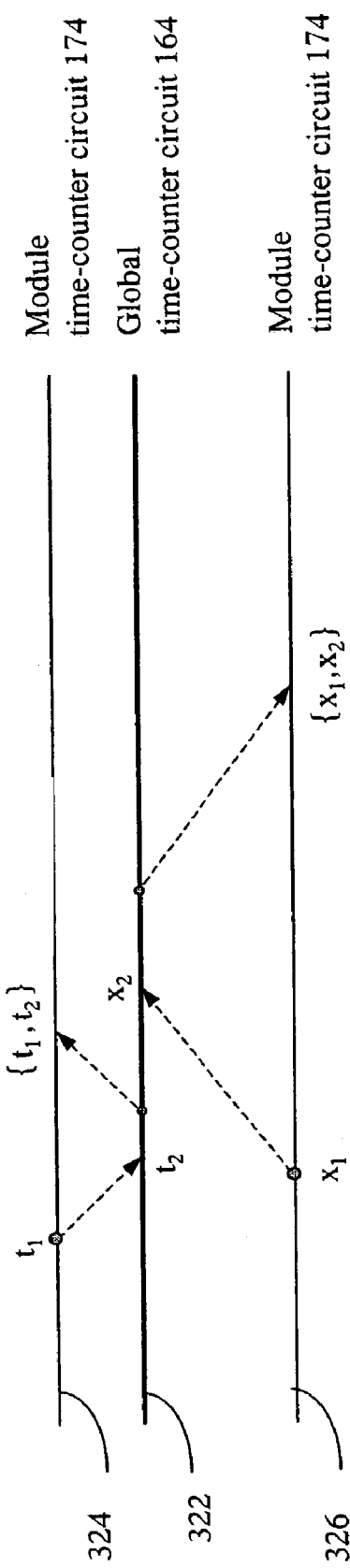
FIGS. 13a and 13b illustrate the process of time-indication alignment at the edge modules.
Figure 13B:
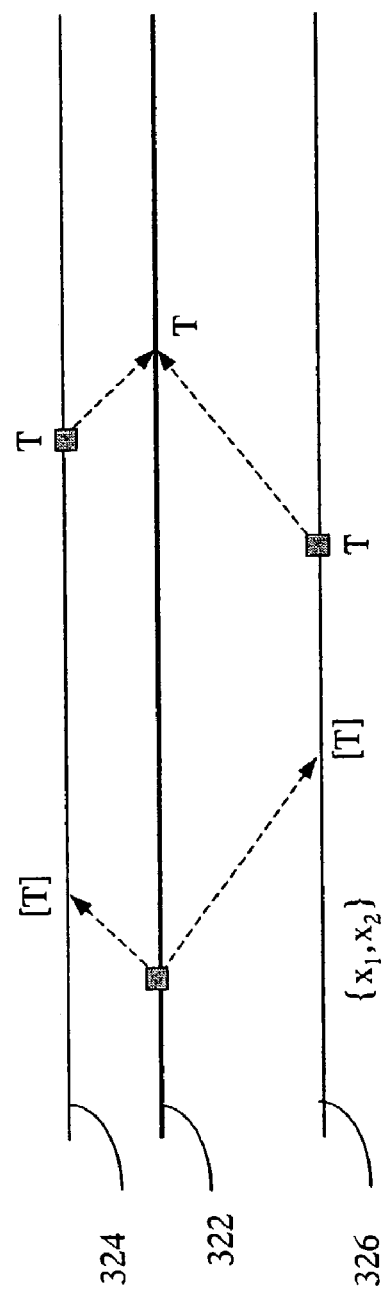

FIG. 13a illustrates an exchange of timing packets between a module 84 and the global controller 162. A module 84 sends a timing packet at time $t_1$, as indicated in the time axis 324. The packet is received at the global timing circuit 164 at time $t_2$, $t_2 > t_1$, as indicated on line 322. The value of $t_1$ need not be known to the global controller 162. The global controller 162 inserts the value $t_2$ in the timing packet and at some later instant returns the packet to the module 84. The module controller 172 is then aware of the values $t_1$ and $t_2$, and uses this information to adjust its local time counter 174. The time counters are cyclic and, as described above, $t_1$ may be zero for simplicity. Similarly, another module 84 transmits its timing packet to the global controller 162 at time $x_1$ as indicated on line 326. The timing packet is received at the global controller 162 at time $x_2$, as indicated on line 322. On receipt of the timing packet at time $x_2$, the global controller 162 time stamps the packet and returns it, as described above.

Time Coordination Process

FIG. 13b illustrates the time coordination process to enable paths to be reconfigured, necessitating changes in the core. The time coordination process requires that the global controller 162 issue a reconfiguration request packet that is multicast simultaneously to all participating modules. As indicated in line 322 of FIG. 13b, the global controller sends the reconfiguration request packets to two modules. The reconfiguration request packet includes the desired reconfiguration time T, in addition to the information on the new connectivity of the core. The local time T in the first module TCC 174, as indicated on line 324, and the local time T in the second module time counter 174, as indicated on line 326, differ in accordance with their propagation delays to the global controller 162. When each module transmits a bit at its local time T, the respective bits from the modules simultaneously reach the channel switch core at the global time T.

If the modules 84 and the channel switch core 82 are co-located, time coordination using the process described above is unnecessary. In that case, the global controller 162 may broadcast reconfiguration packets to all modules before the reconfiguration target time T, permitting a predetermined interval for implementing the reconfiguration changes required at the affected modules.

Figure 14A:
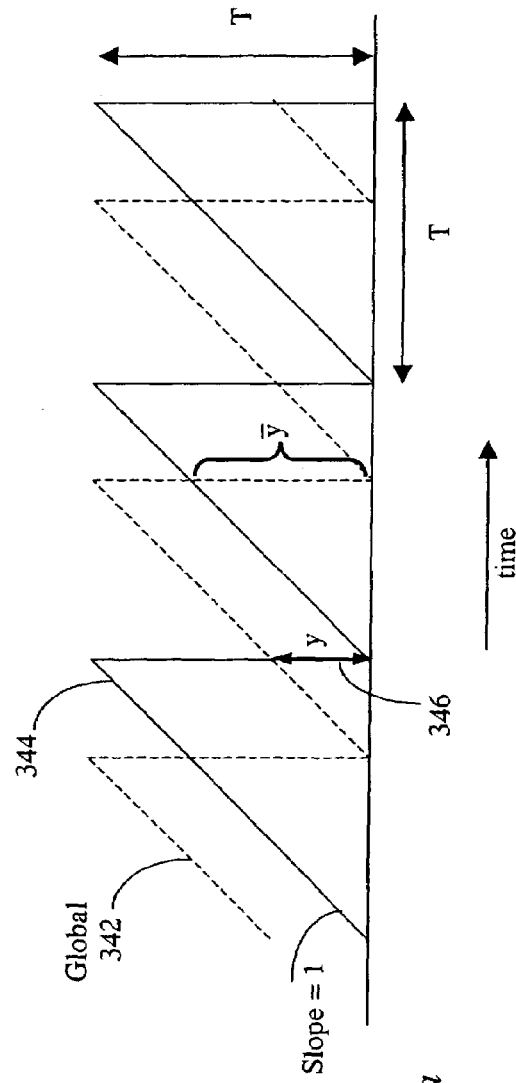
FIGS. 14a and 14b illustrate the phase discrepancy between a global timing counter and a timing counter associated with a module, with both counters being up-counters.
Figure 14B:
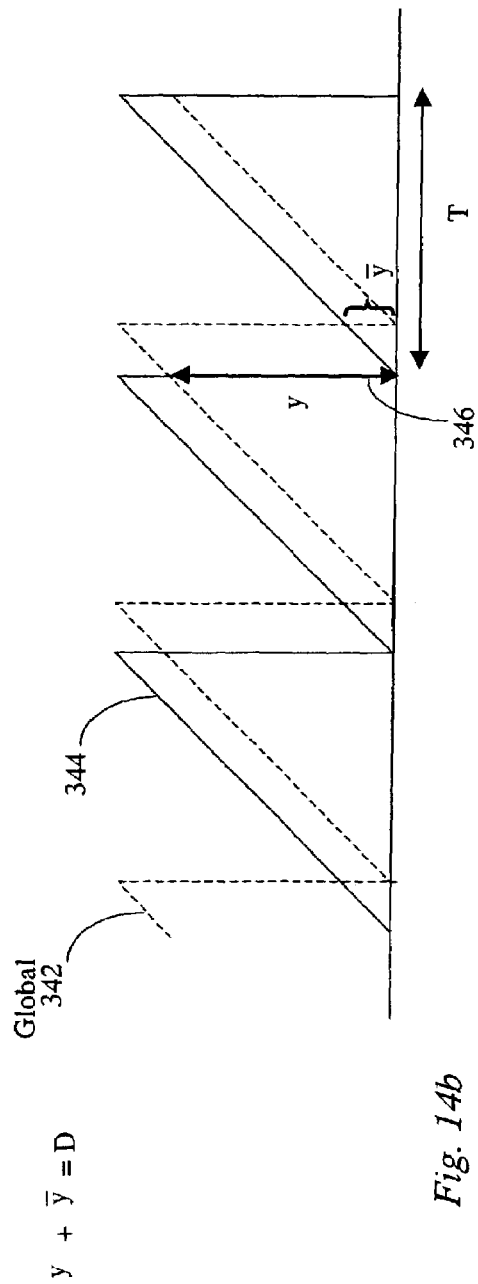
Figure 15A:
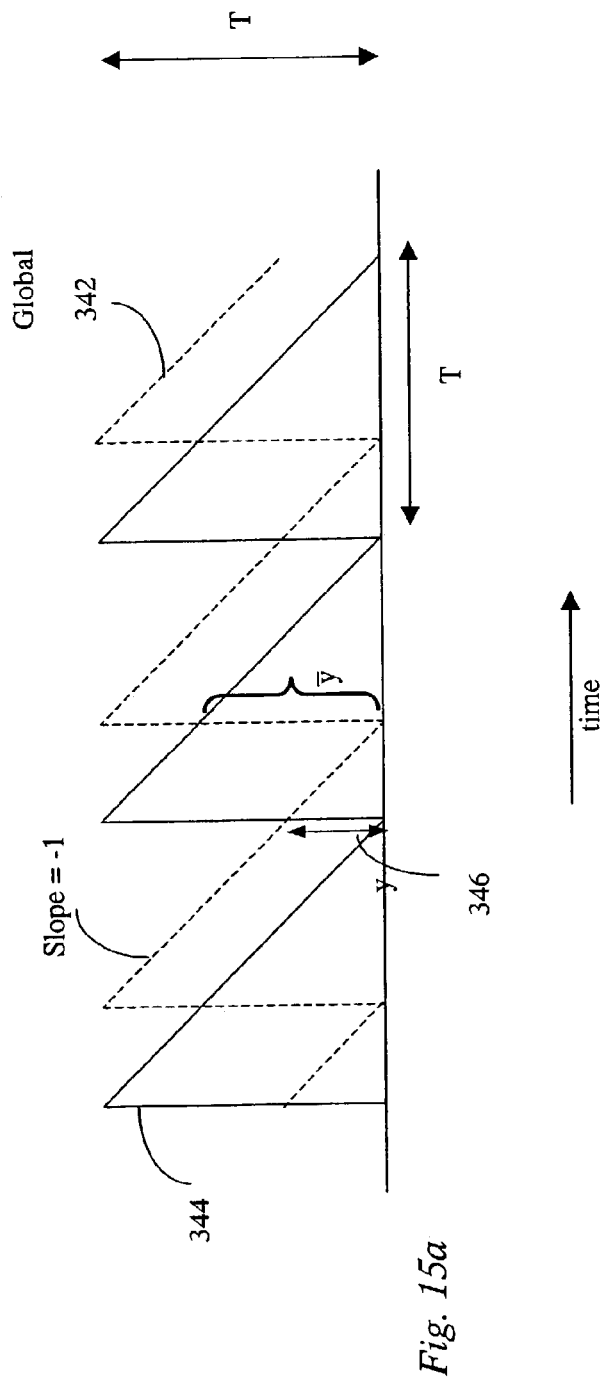
FIGS. 15a and 15b illustrate the phase discrepancy between a global timing counter and a timing counter associated with a module, with both counters being down-counters.
Figure 15B:
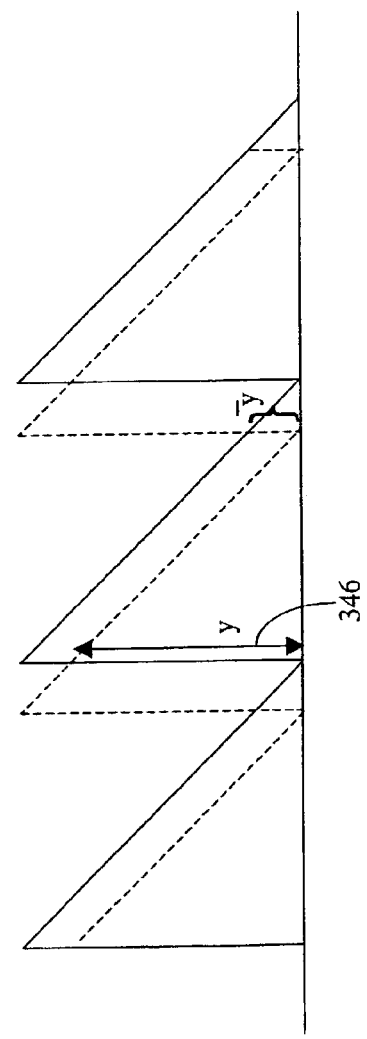

The time coordination process may be implemented using different kinds of counters. The time coordination process using up-counters at the global time counter 164 and at module time counters 174 is illustrated in FIGS. 14a and 14b. The time coordination process using down-counters at the global time counter 164 and the module time counters 174 is illustrated in FIGS. 15a and 15b. The time coordination process using an up-counter at the global time counter 164 and down-counters at module time counters 174 is illustrated in FIGS. 16a and 16b.

FIG. 14a and FIG. 14b illustrate the time counter resetting process at the local time counter circuit 174 in each module 84 in response to packets echoed by the global time counter circuit 164. FIG. 14a shows the case where the local time counter in a circuit 174 is leading the time counter of global circuit 164 and FIG. 14b shows the opposite case.

In FIG. 14a, the output 342 of the global time counter (shown in dotted lines) in circuit 164 and the output 344 of a local time counter (shown in solid lines) in a circuit 174 are shown as a function of time. The output Y is time-shifted by the magnitude of the propagation delay between a given module 84 and the global controller 162. Line 344 represents the local time counter output as if the entire output were transmitted to the global controller 162. A zero phase difference is preferable and in the figure, the outputs 342 and 344 are synchronized but are not aligned. When the output of the local time counter is zero, the module sends a timing packet to the global controller which responds by writing a current value of its global time counter y (346) at the time of receipt of the timing packet and places the timing packet in a response queue. When the timing packet is returned to the module, the module controller 172 resets its local time counter to zero when its output reaches a complement (D−y) where "y" equals the global time stamp inserted in the packet referenced as 348 in FIGS. 14a, 14b., and "D" is the time counter period. If D is a power of 2, then the complement (D−y) is the is complement of Similarly, the two counters may be down counters, as illustrated in FIG. 15a and FIG. 15b.

Preferably, the time indicator at the global controller is an up-counter of C bits and the time indicator at each module is a down counter of C bits, the time counters period D being $2^C$ times the clock period. When a module receives a stamped timing packet, it resets its down counter by resetting each of its C bits to "1". This is illustrated in FIG. 16a and FIG. 16b. Perfect alignment results as shown in the pattern illustrated in FIG. 16b.

Interleaving of Time-Critical and Delay-Tolerant Signals

As described above, each module 84 has at least one channel, called the control channel, connected to module 84a hosting the global controller 162 as shown in FIG. 6. The egress port connecting the channel is hereafter called the control port of the module. The control channel carries timing packets, other control packets, and payload data. When a timing packet arrives at a type-1 buffer, it must egress at a predefined instant and the transfer of a packet from a type-2 buffer may be in progress at that instant. A circuit 380 shown in FIG. 17 associated with the control port enables egress of the two traffic types while meeting the strict time requirement for transmission of the type-1 data.

Timing packets are type-1 data, while all other data can tolerate some jitter and is classified as type-2 data. At least one buffer 384 stores packets of type-1 data and at least one buffer 382 stores packets of type-2 data. The traffic volume of the type-2 data is likely to be much greater than that of the type-1 data.

Each of the type-1 packets must be transferred in accordance with a strict time schedule. The transfer of type-1 and type-2 data packet streams on a shared channel is enabled by the circuit shown in FIG. 17. The circuit 380 is required at each module for the channel connected to the global controller 162. The circuit 380 includes the payload packet buffer 382, the timing packet buffer 384, a payload packet transfer duration indicator 386, and an output 388 of time counter circuit 174 (FIG. 6). Buffer 382 stores type-2 packets and buffer 384 stores type-1 timing packets. The indicator 386 stores a value representative of the time required to transfer a type-2 packet stored buffer 382, and the indicator 388 stores the output of the local time counter. If the local time counter is an up-counter, the output stored in the time counter output indicator is a $1^S$ complement of the reading of the local time counter. The timing packet must be transmitted when the value stored in indicator 388 is zero. The time remaining before a timing packet has to be transferred is indicated by the counter output stored in indicator 388. When a type-2 packet has been transferred, a buffer selection is determined. If timing packet buffer 384 is empty, any packet stored in type-2 buffer 382 is permitted to egress. Otherwise, if the entry in payload packet indicator 386 is smaller than the entry in time counter output indicator 388, the type-2 packet is transferred since the transfer of the type-2 packet will be complete before the time scheduled for transferring the type-1 packet. If the entry in the payload packet duration indicator 386 is larger than the entry in the timing counter output indicator 388, data transfer is disabled since the stored type-2 packet would not be completely transferred before the requested release time of the type-1 timing packet. When the time counter output indicator 388 reads exactly zero, and a timing packet is stored in buffer 384, the timing packet is transferred. A comparator 392 compares the contents of the payload packet duration indicator 386 and time counter output 388 and produces a two-bit output Q. The output Q is "00" if a reading of the time counter output 388 is smaller than a reading of the payload packet duration indicator 386, "10" if the opposite is true, and "11" whenever the reading of the time counter output 388 is zero. The 2:1 selector connects the outgoing channel to the type-1 packet buffer 384 if Q is "11", or the type-2 packet buffer 382 if Q is "10". Otherwise, the 2:1 selector 390 goes to an idle state. This circuit enables both payload and timing packets to be transferred via a channel used for the transfer of control messages and timing packets.

It will be understood by those skilled in the art that the foregoing description is intended to be exemplary only. Changes and modifications to the described embodiments will no doubt become apparent to skilled persons. The scope of the invention is therefore intended to be limited solely by the scope of the appended claims.

The embodiment(s) of the invention described above is(are) intended to be exemplary only. The scope of the invention is therefore intended to be limited solely by the scope of the appended claims.

We claim:

1. An optical channel switch comprising:
    a plurality of wavelength demultiplexers each demultiplexing a corresponding incoming multiplex of W wavelength channels onto W output channels, said wavelength demultiplexers arranged into G demultiplexer groups, indexed as 0 to (G-1), each comprising n wavelength demultiplexers;
    a plurality of optical space switches comprising G×W optical space switches indexed as 0 to (G×W-1) each having n input ports and n output ports, said optical space switches arranged into G switch groups, indexed as 0 to (G-1), each comprising W optical space switches;
    a plurality of wavelength multiplexers each multiplexing W wavelength channels into a corresponding outgoing multiplex, said wavelength multiplexers arranged into G multiplexer groups, indexed as 0 to (G-1), each comprising n wavelength multiplexers;
    wherein an $m^{th}$ input port of an optical space switch of index S, $0 \leq S < G \times W$, connects to an output channel from an $m^{th}$ wavelength demultiplexer from demultiplexer group $(S/G)_{modulo\ G}$; and
    wherein an $m^{th}$ output port of said optical space switch of index S connects to an input of an $m^{th}$ wavelength multiplexer from multiplexer group $\lfloor S/W \rfloor$, $\lfloor S/W \rfloor$ denoting an integer part of the ratio S/W.

2. The optical channel switch of claim 1 wherein an optical space switch of index S, $0 \leq S < G \times W$, from among said plurality of optical space switches, is associated with a wavelength of index $\Lambda = (S+G)_{modulo\ W}$, where $0 \leq \Lambda < W$.

3. The optical channel switch of claim 2 wherein said output channel from said $m^{th}$ wavelength demultiplexer is associated with said wavelength of index $\Lambda$.

4. An optical channel switch comprising:
    a plurality of wavelength demultiplexers each demultiplexing a corresponding incoming multiplex of W wavelength channels onto W output channels, said wavelength demultiplexers arranged into G demultiplexer groups, indexed as 0 to (G-1), each comprising n wavelength demultiplexers;
    a plurality of optical space switches comprising G×W optical space switches, indexed as 0 to (G×W-1), each having n input ports and n output ports, said optical space switches arranged into G switch groups, indexed as 0 to (G-1), each comprising W optical space switches;
    a plurality of wavelength multiplexers each multiplexing W wavelength channels into a corresponding outgoing multiplex, said wavelength multiplexers arranged into G multiplexer groups, indexed as 0 to (G-1), each comprising n wavelength multiplexers;
    wherein an $m^{th}$ input port of an optical space switch of index S, $0 \leq S < G \times W$, connects to an output channel from an $m^{th}$ wavelength demultiplexer from demultiplexer group $\lfloor S/W \rfloor$, $\lfloor S/W \rfloor$ denoting an integer part of the ratio S/W; and
    wherein an $m^{th}$ output port of said optical space switch of index S connects to an input of an $m^{th}$ wavelength multiplexer from multiplexer group $(S/G)_{modulo\ G}$.

5. The optical channel switch of claim 4 wherein an optical space switch of index S, $0 \leq S < G \times W$, from among said plurality of optical space switches, is associated with a wavelength of index $\Lambda = (S+G)_{modulo\ W}$, $0 \leq \Lambda < W$.

6. The optical channel switch of claim 5 wherein said output channel from said $m^{th}$ wavelength demultiplexer is associated with said wavelength of index $\Lambda$.

7. At a global controller of a channel switch, the channel switch having N incoming channels, one from each data switching module from among N data switching modules, and N outgoing channels, one to said each data switching module, a method of reconfiguring said channel switch comprising the steps of:
    storing available incoming capacity of said N incoming channels and available outgoing capacity of said N outgoing channels in a 2×N module-state-matrix;
    receiving connection requests each connection request identifying a source module from among said data switching modules, a sink module from among said N data switching modules, and a capacity requirement;
    storing said each connection request in a standby queue when said capacity requirement exceeds the lesser value of corresponding available incoming capacity and available outgoing capacity;
    storing said each connection request in a connection-request queue and debiting entries in said module-statematrix corresponding to said each connection request according to said capacity requirement when said required capacity does not exceed said lesser value; and during each of periodic reconfiguration cycles:

sorting entries, if any, in said connection-request queue and said standby queue in a descending order according to capacity requirement;

finding paths through the channel switch for stored connection requests in said connection-request queue;

crediting entries, in said module-state-matrix, corresponding to any connection request in said connection-request queue for which a path through the channel switch cannot be assigned;

exploring paths for standby connection requests in said standby queue;

debiting entries, in said module-state-matrix, corresponding to any connection request in said standby queue for which a path is assigned.

8. The method of claim 7 wherein said step of finding comprises steps of:

performing a direct matching process to assign a direct path traversing said channel switch for each said stored connection request; and performing a double matching process to assign a loop path for any said stored connection request for which a direct path is not available.

9. The method of claim 8 wherein said step of exploring comprises steps of:

performing a direct matching process to assign a direct path traversing said channel switch for each said standby connection request; and performing a double matching process to assign a loop path for any said standby connection request for which a direct path is not available.

10. The method of claim 3 further comprising a step of retaining identifiers for a connection request for which a path is not assigned in a current reconfiguration cycle of said periodic reconfiguration cycles for consideration in a subsequent reconfiguration cycle of said periodic reconfiguration cycles.

11. The method of claim 9 further comprising a step of placing identifiers for a connection request for which a path is assigned in a progress queue.

12. The method of claim 9 further comprising a step of communicating results of said finding and said exploring to corresponding data switching modules.

13. The method of claim 7 where said channel switch is an optical channel switch comprising:

a plurality of wavelength demultiplexers each demultiplexing a corresponding incoming multiplex of W wavelength channels onto W output channels, said wavelength demultiplexers arranged into G demultiplexer groups indexed as 0 to (G-1);

a plurality of G×W optical space switches indexed as 0 to (G×W−1) each having n input ports and n output ports, said optical space switches arranged into G switch groups, indexed as 0 to (G-1), each said switch group comprising W optical space switches; and a plurality of wavelength multiplexers each multiplexing W wavelength channels into an outgoing multiplex comprising W wavelength channels, said wavelength multiplexers arranged into G multiplexer groups, indexed as 0 to (G-1);

wherein said direct matching process is performed using:

a first matrix of n columns and G×W rows each entry of which indicating a free capacity in a respective input channel of an optical space switch; and a second matrix of n columns and G×W rows each entry of which indicating a free capacity in a respective output channel of a space switch, the outcome of the matching process being an identifier of an output channel corresponding to each input channel of each space switch, the identifier being stored in a matrix of n columns and G×W rows.

14. The method of claim 13 wherein said direct matching process follows a predetermined search order for each entry in said first matrix.

* * * * *